United States Patent
Li et al.

(10) Patent No.: US 11,763,076 B2
(45) Date of Patent: Sep. 19, 2023

(54) DOCUMENT APPLET GENERATION

(71) Applicant: Tencent Technology (Shenzhen) Company Limited, Guangdong (CN)

(72) Inventors: Sen Li, Shenzhen (CN); Yuting Yang, Shenzhen (CN); Di Zhang, Shenzhen (CN); Yu Wang, Shenzhen (CN); Yin Qin, Shenzhen (CN); Xiang Zhang, Shenzhen (CN); Xianqing Yan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/902,667

(22) Filed: Sep. 2, 2022

(65) Prior Publication Data
US 2022/0414326 A1    Dec. 29, 2022

Related U.S. Application Data

(63) Continuation of application No. PCT/CN2021/106473, filed on Jul. 15, 2021.

(30) Foreign Application Priority Data

Aug. 19, 2020   (CN) .................. 202010837278.X

(51) Int. Cl.
   *G06F 40/186*    (2020.01)
   *G06F 9/451*     (2018.01)

(52) U.S. Cl.
   CPC .......... *G06F 40/186* (2020.01); *G06F 9/451* (2018.02)

(58) Field of Classification Search
   None
   See application file for complete search history.

(56) References Cited

U.S. PATENT DOCUMENTS 6,226,654 B1 * 5/2001 Van Hoff ............... G06F 9/451
                                                      709/219
9,933,929 B1 * 4/2018 Pitsillides ............ G06F 9/451
                        (Continued)

FOREIGN PATENT DOCUMENTS

CN       103686396 A      3/2014
CN       107506191 A *  12/2017  ............. G06F 9/451
                        (Continued)

OTHER PUBLICATIONS

International Search Report and Written Opinion dated Oct. 12, 2021 in International Application No. PCT/CN2021/106473 with English Translation (10 pages).

*Primary Examiner* — Hassan Mrabi
(74) *Attorney, Agent, or Firm* — ARENTFOX SCHIFF LLP

(57) ABSTRACT

A method for generating a document applet is provided. In the method, an editing interface including an editing region and a component list is displayed. The component list includes a plurality of predefined components. Each of the predefined components is configured to provide a document input template. At least one target component of the plurality of predefined components is added in the editing region. A page of the document applet is generated to include the document input template of each of the at least one target component in the editing region. The document applet is provided to a server. The document applet is configured to perform document processing via the page when downloaded to a user terminal.

20 Claims, 24 Drawing Sheets

(56) References Cited

U.S. PATENT DOCUMENTS

2014/0250411 A1 9/2014 Gilra et al.
2021/0224824 A1* 7/2021 Bowers ................ G06F 40/131

FOREIGN PATENT DOCUMENTS

| CN | 108415706 A | 8/2018 |
| CN | 110688829 A | 1/2020 |
| CN | 111273907 A | 6/2020 |
| CN | 111443911 A | 7/2020 |
| CN | 112632942 A | 4/2021 |

* cited by examiner

DOCUMENT APPLET GENERATION

RELATED APPLICATIONS

The present application is a continuation of International Application No. PCT/CN2021/106473, filed on Jul. 15, 2021, which claims priority to Chinese Patent Application No. 202010837278.X, filed on Aug. 19, 2020. The entire disclosures of the prior applications are hereby incorporated by reference in their entirety.

FIELD OF THE TECHNOLOGY

This disclosure relates to the field of computer technologies and applications, including to word and document processing (e.g., a document applet).

BACKGROUND OF THE DISCLOSURE

An information editing product (for example, a word and document processing application) can refer to a product that processes and organizes information content through editing behaviors. The information editing product can be used in many scenarios. For example, in a text reading scenario, a word and document processing application can be used to write text. In another example, in a daily reporting scenario, a word and document processing application can be used to collect daily work logs. Currently, the information editing products, such as word and document processing applications, are generally created by developers writing code based on professional development tools, resulting in relatively high complexity of creation. In addition, word and document processing applications are usually developed and created based on fixed and limited scenario requirements, can support relatively limited scenario types, and in many cases, cannot meet actual scenario requirements of users, resulting in relatively low practicability.

SUMMARY

Embodiments of this disclosure include a word and document processing applet generation method, apparatus, and device, and a non-transitory computer-readable storage medium. The embodiments can be used to implement a word and document processing application applicable to various scenario types. The embodiments can be used, for example, to more effectively reduce the complexity of creation of a word and document applet, or document processing application, and improve the convenience of creation of the document applet, or the word and document processing application.

The embodiments of this disclosure provide a method for generating a document applet. In the method, an editing interface including an editing region and a component list is displayed. The component list includes a plurality of predefined components. Each of the predefined components is configured to provide a document input template. At least one target component of the plurality of predefined components is added in the editing region. A page of the document applet is generated to include the document input template of each of the at least one target component in the editing region. The document applet is provided to a server. The document applet is configured to perform document processing via the page when downloaded to a user terminal.

The embodiments of this disclosure further provide an information processing apparatus. The information processing apparatus includes processing circuitry that is configured to display an editing interface including an editing region and a component list. The component list includes a plurality of predefined components, each of the predefined components being configured to provide a document input template. The processing circuitry is configured to add at least one target component of the plurality of predefined components in the editing region. The processing circuitry is configured to generate a page of the document applet to include the document input template of each of the at least one target component in the editing region. Further, the processing circuitry is configured to provide the document applet to a server. The document applet is configured to perform document processing via the page when downloaded to a user terminal.

The embodiments of this disclosure further provide a non-transitory computer-readable storage medium storing instructions which when executed by a processor cause the processor to perform the method for generating a document applet.

In a technical solution, the candidate component is dragged from the component center panel to the editing region, so that the operation of creating the word and document processing application based on the target component is simple and convenient.

In the foregoing process, the first word and document processing application (e.g., a document applet) can be created through a simple and convenient combination of components, which achieves codeless creation of a word and document processing application, reduces the complexity of creation of a word and document processing application, and improves the convenience of creation of a word and document processing application. In addition, the first word and document processing application can be generated by selecting components under one or more scenario types for combination, so that the first word and document processing application can appropriately meet actual scenario-based requirements of a user. Each user can become a creator of a solution under a specific scenario by creating a word and document processing application, thereby enhancing the user's sense of belonging and participation in a content editing product.

BRIEF DESCRIPTION OF THE DRAWINGS

To describe the technical solutions in the embodiments of this disclosure more clearly, the following outlines the drawings to be used in the description of embodiments of this disclosure. The drawings outlined below are merely a part of embodiments of this disclosure. Other embodiments are within the scope of this disclosure.

DESCRIPTION OF EMBODIMENTS

Figure 1:
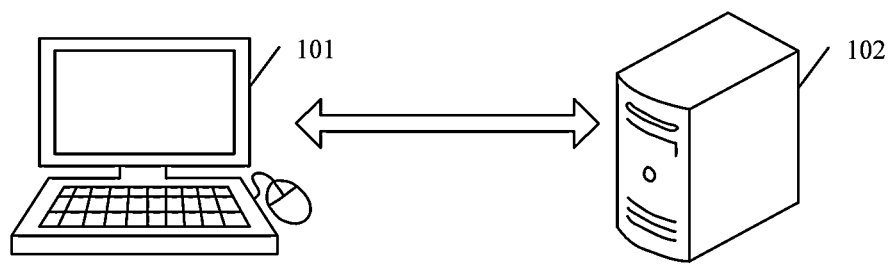
FIG. 1 is a schematic architectural diagram of a document processing system according to an embodiment of this disclosure.

Technical solutions in embodiments of this disclosure are described below with reference to the accompanying drawings in the embodiments of this disclosure. The described embodiments are merely some rather than all of the embodiments of this disclosure. Other embodiments are within the scope of this disclosure.

The following terms and concepts are included in the embodiments of this disclosure.

(1) A component, which can include an editing component, a control, a part, or the like, can be a simple encapsulation of data and a method. Already-processed or newly-developed editing capabilities of an application (e.g., Tencent Docs) are componentized (i.e., encapsulated into components), data and methods are constructed into blocks. In this way, the encapsulated data and methods can be called by calling the components.

(2) A word and document processing application, can include an application configured to process various content included in a document such as words, images, etc. For example, the document processing application can be referred to as, or include, a word and document processing mini program, a word and document processing applet, or a document applet, that can be accessed through the Internet. The word and document processing application includes one or more service pages. A service page refers to an interface page that provides a word and document editing service for users and may be implemented by a webpage.

(3) A canvas can include a carrier for presenting components and supporting combining and editing components into scenario-based solutions.

The word and document processing application may need to be used in various scenarios. The scenarios herein may include, but are not limited to: a text reading scenario, a data analysis scenario, a daily reporting scenario, a questionnaire survey scenario, a team building registration scenario, a demand management scenario, an information collection scenario, and the like. To better adapt to actual requirements of various scenarios, word and document processing applications that meet the requirements of the scenario need to be created and developed. Based on this, embodiments of this disclosure include a word and document, or other content processing solution. The solution utilizes an editing interface provided by a canvas and configured to create a word and document processing application, where the editing interface displays various scenario types and a plurality of components under various scenario types, and can quickly create a word and document processing application that meets scenario requirements by selecting components and combining, editing, and configuring the components in the editing interface, thereby effectively reducing the complexity of creation of a word and document processing application and improving the convenience of creation of a word and document processing application.

The following describes a word and document processing method provided in an exemplary embodiment of this disclosure in detail with reference to the accompanying drawings.

FIG. 1 is a schematic architectural diagram of a word and document processing system, according to an embodiment of this disclosure. As shown in FIG. 1, the word or document processing system may include a terminal device 101 and a server 102. The quantities of terminal devices and servers in the word and document processing system shown in FIG. 1 are merely used for illustration. For example, there may be a plurality of terminal devices and a plurality of servers. The quantities of terminal devices and servers are not limited in this disclosure. The terminal device 101 may include, but is not limited to, devices such as a smart phone (e.g., an Android mobile phone or an iOS mobile phone), a tablet computer, a portable personal computer, a mobile Internet device (MID), and a smart device. The type of the terminal device 101 is not limited in the embodiments of this disclosure. The terminal device 101 includes a display screen. The display screen may be a physical screen, a touchscreen, or the like. The server 102 may be an independent physical server, or may be a server cluster including a plurality of physical servers or a distributed system. The second server 102 may be a cloud server. The cloud server is configured to provide basic cloud computing services such as a cloud service, a cloud database, cloud computing, a cloud function, cloud storage, a network service, cloud communication, a middleware service, a domain name service, a security service, a CDN, and a big data and artificial intelligence platform. The terminal device 101 may be communicatively connected to the server 102 directly or indirectly in a wired or wireless manner, and the specific connection manner between the terminal device 101 and the server 102 is not limited in this disclosure.

In the word and document processing system shown in FIG. 1, a user may create a word and document processing application that meets scenario requirements in the terminal device 101, and use the word and document processing application in a specific scenario by interacting with the server 102.

I. The procedure of creating a word and document processing application that meets scenario requirements on a side of the terminal device 101 can include the following steps:

(1) The terminal device 101 displays an editing interface configured to create a first word and document processing application. The editing interface may be carried and provided by canvas. The first word and document processing application refers to any word and document processing application. The editing interface includes an editing region and a component center panel. The component center panel includes a component list. The component list includes at least one scenario type and a plurality of components under each scenario type.

(2) Select one or more components from the component list and present the one or more components in the editing region. In addition, a template component may be preset in the editing region. The components support being selected and being combined. In this way, not only the components can be effectively managed in a modularized manner, but also a word and document processing application can be quickly created in a stacking manner, and further, a created first word and document processing application can meet scenario requirements.

(3) Configure a target component in the editing region (e.g., a selected component and/or template component), for example, adjust a position, a quantity, a size, content, or the like of the target component(s). The configured editing region forms an architecture of a service page of the first word and document processing application, and therefore, the first word and document processing application is generated.

In the foregoing procedure, the user may generate a first word and document processing application by selecting components under one or more scenario types for combination, so that the first word and document processing application can appropriately meet actual scenario-based requirements of the user. In addition, the first word and document processing application can be created through a simple and convenient combination of components, which achieves codeless creation of a word and document processing application, reduces the complexity of creation of a word and document processing application, and improves the convenience of creation of a word and document processing application.

II. The procedure in which the server 102 interacts with the terminal device 101 can include the following steps:

(1) The server 102 provides various data required for creating a word and document processing application, for example, a component list in a component center panel, to the terminal device 101.

(2) When the word and document processing application created by the terminal device 101 supports publishing and sharing, the server 102 supports the publishing and sharing processes. For example, when the terminal device 101 requests to publish the first word and document processing application, the server 102 generates an access link for the first word and document processing application. In another example, when the terminal device 101 requests to share the first word and document processing application, the server 102 provides a list of shared objects and the like to the terminal device 101.

In the embodiments of this disclosure, the terminal device 101 may be configured to create a word and document processing application (e.g., a first word and/or document processing application) that meets scenario requirements. The editing interface configured to create the first word and document processing application includes an editing region and a component center panel. The component center panel includes a component list. The component list includes at least one scenario type and a plurality of components under each scenario type. The editing region displays at least one target component. The target component may be a template component selected from the component list or preset in the editing region. The first word and document processing application can be generated by simply editing a component combination obtained by selecting components under one or more scenario types, so that the first word and document processing application can appropriately meet actual scenario-based requirements of a user, thereby achieving codeless creation of a word and document processing application and reducing the complexity of creation of a word and document processing application. In addition, in a process in which the terminal device 101 interacts with the server 102, the server 102 may provide various data required for creating a word and document processing application to the terminal device 101 and provide various technical supports to the terminal device 101.

Figure 2:
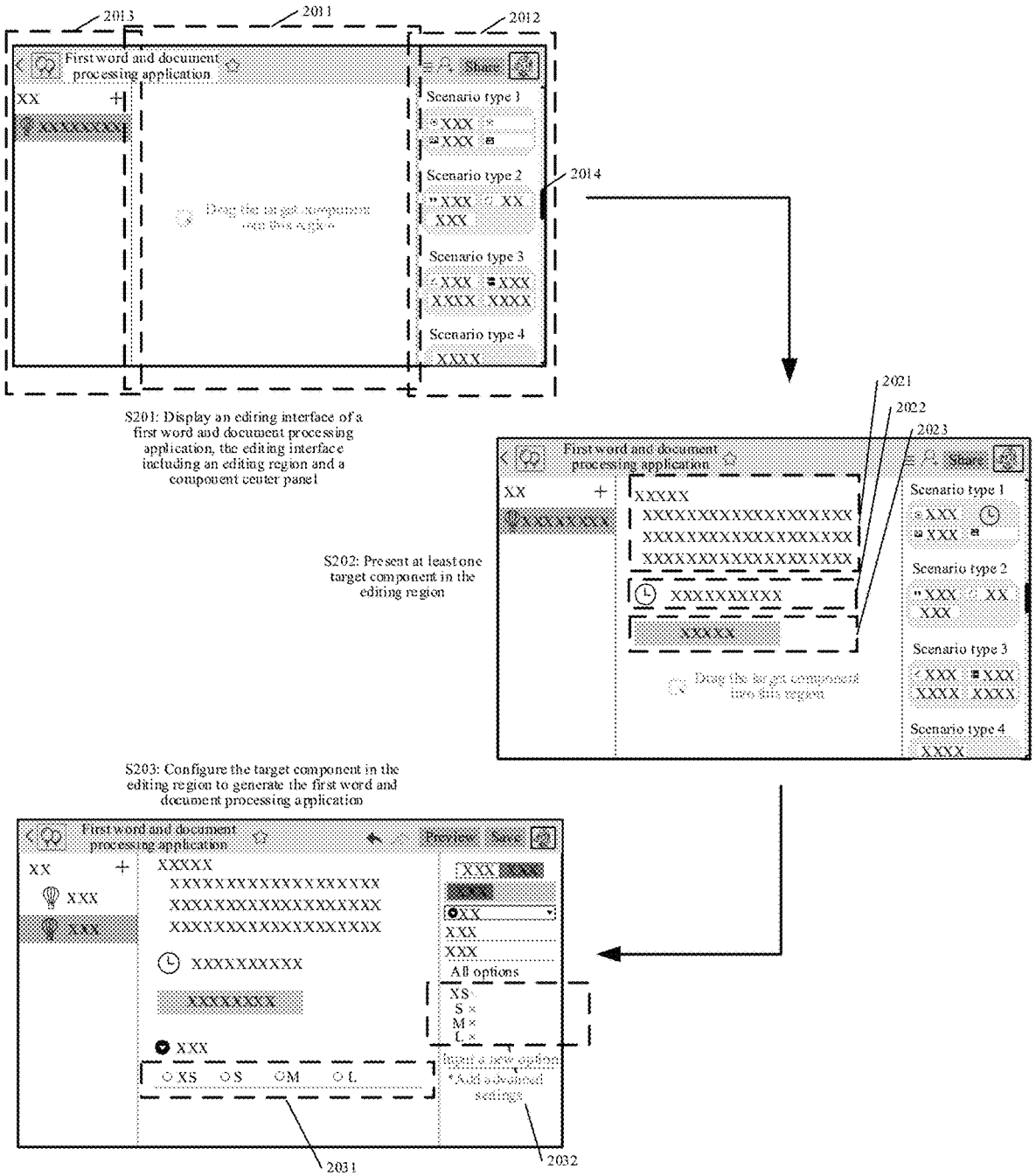
FIG. 2 is a schematic flowchart of a word and document processing method according to an embodiment of this disclosure.

FIG. 2 is a schematic flowchart of a word and document processing method according to an embodiment of this disclosure. The word and document processing method may be performed by a computing device, for example, may be performed by the terminal device 101 or the server 102 in the system shown in FIG. 1. In some embodiments, when the method is performed by the terminal device 101, the terminal device 101 may need to obtain required resources, for example, an editing interface and a component list, from the server 102, and transmit a service page of a generated word and document processing application to the server 102 for storage. In some embodiments, when the method is performed by the server 102, the server 102 may obtain, from the terminal device 101, various instructions entered by a user. The word and document processing method may include the following steps S201 to S203:

In step S201, an editing interface of a first word and document processing application is displayed. The editing interface includes an editing region and a component center panel. The component center panel includes a component list. The component list includes a plurality of predefined components. Each component is configured to execute a word and document processing function under at least one scenario type. In some embodiments, the component list may include at least one scenario type and a plurality of components under each scenario type.

In step S202, at least one target component is presented in the editing region, the target component including at least one of the following: a template component or a component selected from the component center panel. The component may be selected from the component center panel according to a received selection instruction.

In step S203, the target component in the editing region is configured to generate the first word and document processing application. A service page of the first word and document processing application may be generated by using the target component in the editing region, so as to generate the first word and document processing application. The service page is provided to a device accessing the first word and document processing application, to enable the device to perform word and document processing through the service page.

The generated service page of the first word and document processing application may be stored on a server side for subsequent use. For example, in response to an instruction of accessing the first word and document processing application, the service page may be provided for word and document processing through the service page.

In step S201 to step S203, the editing interface of the first word and document processing application refers to an editable interface carried and provided by canvas and configured to create the first word and document processing application. The user may edit the service page of the first word and document processing application by selecting components from the editing interface and combining the components, thereby generating the first word and document processing application that meets scenario-based requirements. As shown in FIG. 2, the editing interface includes an editing region 2011 and a component center panel 2012.

The editing region 2011 is a region for editing one or more service pages of the first word and document processing application. The editing region 2011 includes one or more target components. The service page of the first word and document processing application that meets scenario requirements may be obtained by configuring the target component (including configurations such as adjusting a position of the target component, increasing or reducing a quantity of the target components, and updating content of the target component), to generate the first word and document processing application. That is, the service page of the first word and document processing application is formed by combining target components. A manner of configuring the target component may include, but not limited to, at least one of the following: (1) Add or delete a target component to or from the editing region. The addition or deletion herein may be implemented in the following manner: dragging a new component in the component list to the editing region 2011. When the component is successfully placed in the editing region 2011, the component serves as a newly added target component in the editing region 2011. Similarly, when one target component in the editing region 2011 is dragged out of the editing region 2011, the target component is deleted from the editing region 2011. It may be understood that, the addition may be achieved in another manner. For example, an addition or deletion menu bar may be set. An addition or deletion option is selected from the menu bar to add or delete a target component to or from the editing region. In another example, a blank position of the editing region 2011 is right-clicked to add a target component, or a target component in editing region 2011 is long-pressed to call a delete button for the target component, to delete the target component, and so on. A specific implementation of an addition or deletion operation is not limited in the embodiments of this disclosure. (2) Adjust an attribute of the target component, the attribute including at least one of a position, a size, or a style. The position refers to an arrangement position of the target component in the editing region 2011. For example, a specific target component in the editing region 2011 may be selected, and the selected target component may be dragged from a first position to a second position in the editing region 2011. That is, a position of the target component is adjusted. The size refers to a size of the target component. For example, a shape of a specific target component is represented as a rectangular box. A vertex of the rectangular box of the target component is selected and dragged, to adjust the size of the target component. The style refers to a presentation form of the target component, including a shape, a foreground, a background, and the like. For example, a rectangular target component is adjusted into a circular target component, which adjusts the style of the target component. In another example, a background image or background color of the target component is changed, which also adjusts the style of the target component. (3) Change content of the target component, the content including at least one of a form, a text, or a picture. For example, one piece of text content is added to a specific target component, or a row or a column is added or deleted to or from a form carried in a specific target component, and so on.

The component center panel 2012 includes a component list. The component list includes at least one scenario type and a plurality of components under each scenario type. As can be seen from the foregoing description, word and document processing applications need to be used in many scenarios. When requirements under respective scenario types are different, and pieces of function logic of word and document processing applications that need to be used are also different, different components need to be used when creating word and document processing applications under different scenario types. In the embodiments of this disclosure, the component list records a plurality of scenario types and a plurality of components under each scenario type, which is convenient for the user to select components according to respective scenario requirements, to create a word and document processing application that meets scenario requirements. The scenario type herein may include, but not limited to: a text reading scenario, a data analysis scenario, a daily reporting scenario, a questionnaire survey scenario, a team building registration scenario, a demand management scenario, an information collection scenario, and the like. The components under respective scenario types are also different. For example, in the team building registration scenario, since a registration form related to team building may be used, under the team building registration scenario type, a form component (e.g., a component carrying a form) related to team building may be included, in the data analysis scenario, since an editing function of data analysis may be used, a data classification component may be included under the data analysis scenario type, and so on. Because the length of the display screen of the terminal device is limited, components under respective scenario types in the component list may not all be displayed on the display screen. In this case, the component center panel 2013 may include a sliding axis 2014. By sliding the sliding axis 2014, a hidden scenario type and a plurality of components under the scenario type can be slidably displayed in the component list. It may be understood that in addition to the slidably displaying manner, on the component center panel 2012, a hide button "+" is set under each scenario type. When the hide button "+" is clicked, some or all components under the scenario type may be hidden, and when a component under the scenario type needs to be used, the hide button "+" is clicked again to display some or all of the components under the scenario type, which is convenient for selection and use. In addition, scenario types and components under the scenario types in the component list may be sorted and displayed randomly. When it is determined that a to-be-created first word processing application serves a specific scenario required by the user, the components under the scenario types in the component list may also be sorted and displayed in descending order according to correlations between the scenarios types and the scenario type required by the user. In this way, scenario types displayed at the front and their components can meet actual scenario requirements of the user more appropriately, and are more likely to be selected and used. This disclosure further supports other forms of selection, such as searching a scenario type and a component. For example, an input box is provided in the component center panel 2012, and the user can enter a keyword to find, through searching, a scenario type matching the keyword and a plurality of components under the scenario type. For example, the user may enter "team building" in the input box, so that team building registration and a plurality of components under the team building registration scenario can be found through searching, which is convenient for the user to select components related to team building for use.

Referring to FIG. 2 again, the component center panel 2012 further includes configuration information of components, advanced settings, and the like. Therefore, in addition to that the target component is configured in the editing region, the target component may also be configured in the component center panel 2012. For example, referring to FIG. 2, a target component 2031 is displayed in the editing region 2011 of the first word and document processing application, and configuration information 2032 corresponding to the target component 2031 is displayed in the component center panel 2012, so that the target component 2031 can be configured in the component center panel. For example, a size option of the target component 2031 is added (e.g., an option XL is added) to the component center panel 2012, and the newly added option is displayed in the target component 2031 in the editing region, so that the target component can be configured in the component center panel.

Figure 3A:
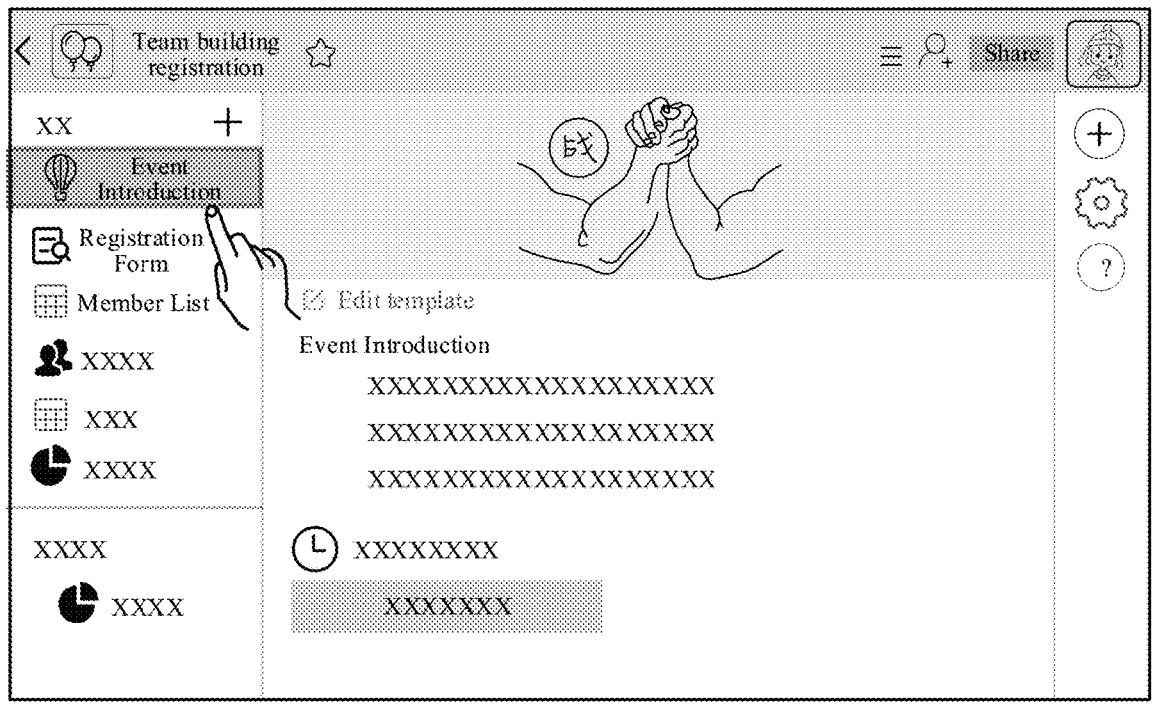
FIG. 3A is a schematic diagram of an editing interface according to an embodiment of this disclosure.
Figure 3B:
FIG. 3B is a schematic diagram of another editing interface according to an embodiment of this disclosure.
Figure 3C:
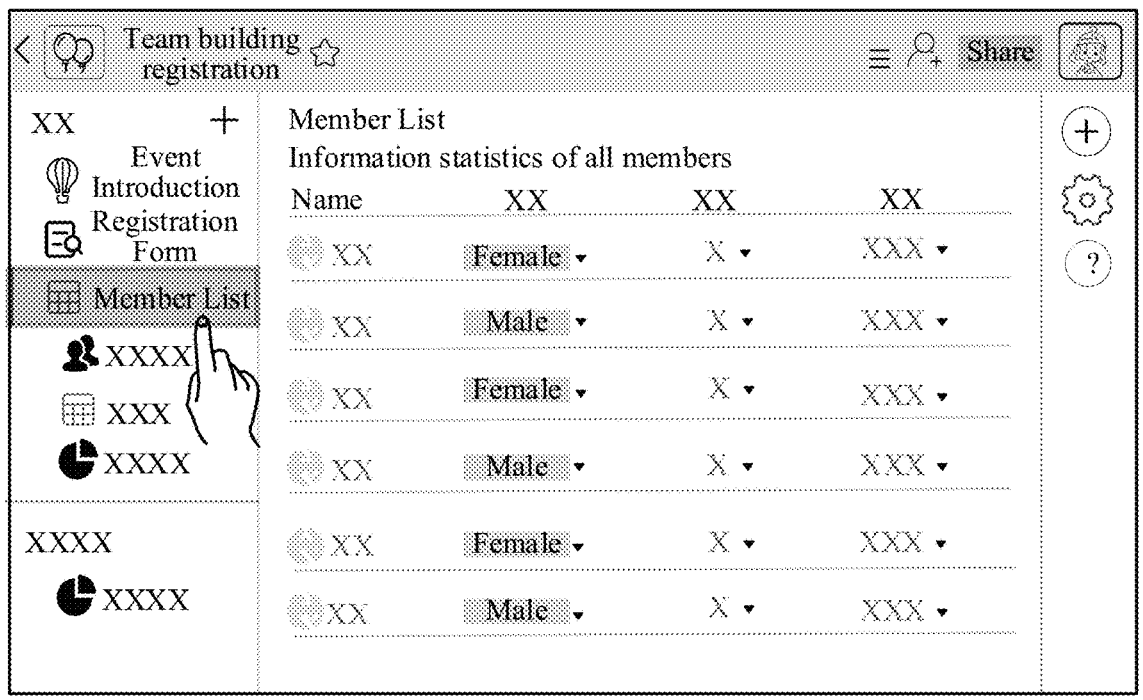
FIG. 3C is a schematic diagram of another editing interface according to an embodiment of this disclosure.

As shown in FIG. 2, the editing interface of the first word and document processing application further includes a page list region 2013. The page list region 2013 may be understood as a directory region of the first word and document processing application. The directory region may be configured to present one or more service pages of the first word and document processing application. The service page of the first word and document processing application formed through editing in the editing region 2011 may have a relatively large quantity of pieces of content and a relatively long length. Because the length of the display screen of the terminal device is limited, or to adapt to reading or presentation, the service page formed through editing in the editing region 2011 may be segmented into a pluralities of parts. For example, page segmentation is performed according to the length of the display screen, or page segmentation is performed according to titles of parts of content in the service page, or page segmentation is performed according to the content in the service page. Each part obtained through segmentation forms a service page of the first word and document processing application. The service pages are presented in the form of identifiers (e.g., titles, IDs, or segmentation numbers) in the page list region 2013. For example, the page list region 2013 displays titles of service pages included in the first word and document processing application. When a received user instruction indicates that any title in the page list region 2013 is selected, the editing region may display a layout and content of target components in a service page corresponding to the title, and in addition, the component center panel 2012 displays information, such as configuration information and advanced settings, of the target components corresponding to the title. For example, FIG. 3A is a schematic diagram of an editing interface according to an embodiment of this disclosure, FIG. 3B is a schematic diagram of another editing interface according to an embodiment of this disclosure, and FIG. 3C is a schematic diagram of another editing interface according to an embodiment of this disclosure. As shown in FIG. 3A, FIG. 3B, and FIG. 3C, when the first word and document processing application is a word and/or document processing application under the team building registration scenario, the page list region 2013 includes service pages presented according to titles. When a title "Event Introduction" is selected, content (e.g., an event time and an event location) under the title "Event Introduction" is displayed in the editing region. When a title "Registration Form" is selected, content (e.g., registration matters) under the title "Registration Form" is displayed in the editing region. When a title "Member List" is selected, content (information, such as the name and gender, about members) under the title "Member List" is displayed in the editing region. In addition, referring to FIG. 3B, the editing region 2011 may further include a sliding axis 301. When the sliding axis 301 is slid, the editing region 2011 slidably displays content of the first word and document processing application. Correspondingly, the page list region 2013 highlights a title of the content displayed in the editing region in real time. The highlighting manner may include displaying at a high brightness, displaying in color, and the like. For example, the displaying at a high brightness refers to displaying a region occupied by a highlighted title at a brightness higher than a brightness of another region, and the displaying in color refers to displaying the highlighted title in a font with a color different from that of another font.

Figures 4A, 4B:
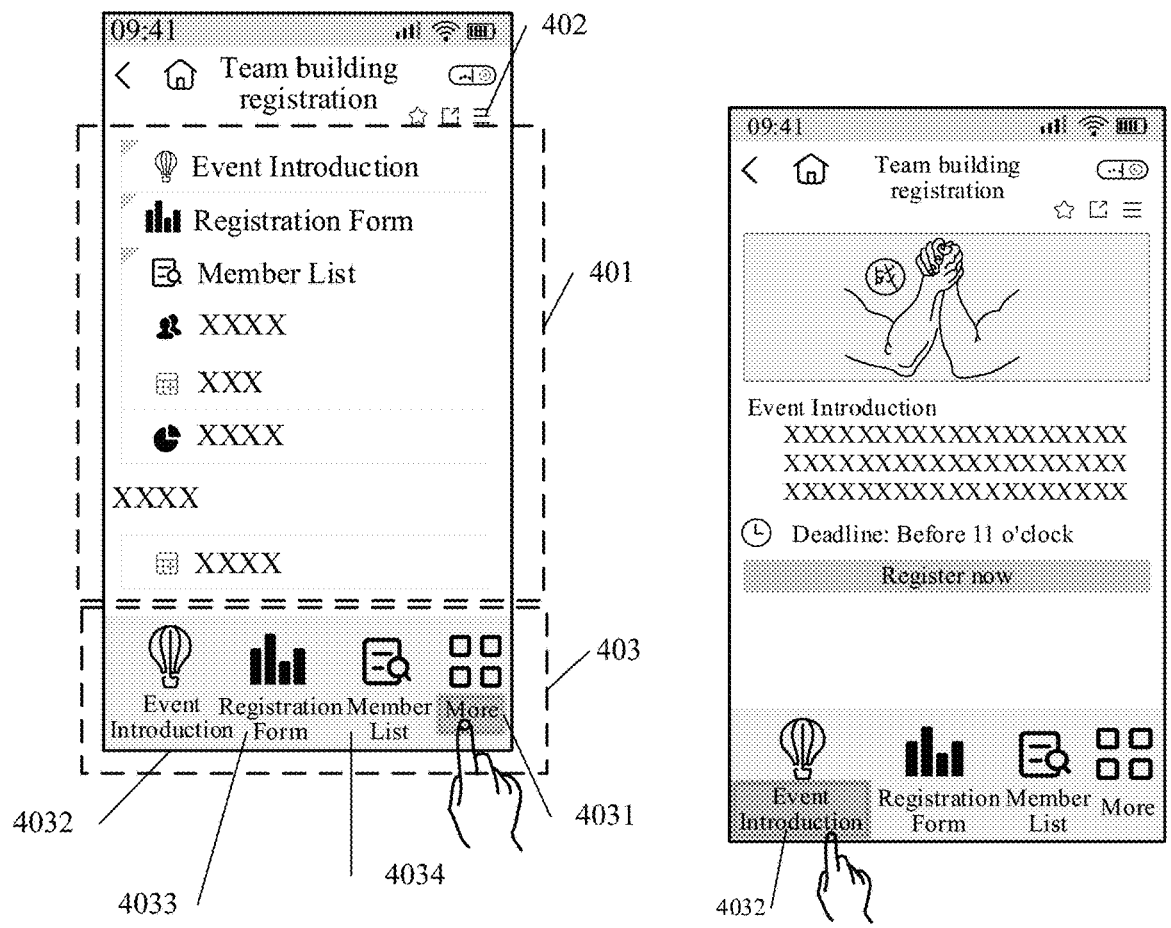
FIG. 4A is a schematic diagram of a page list region according to an embodiment of this disclosure.
FIG. 4B is a schematic diagram of another editing interface according to an embodiment of this disclosure.
Figure 4C:
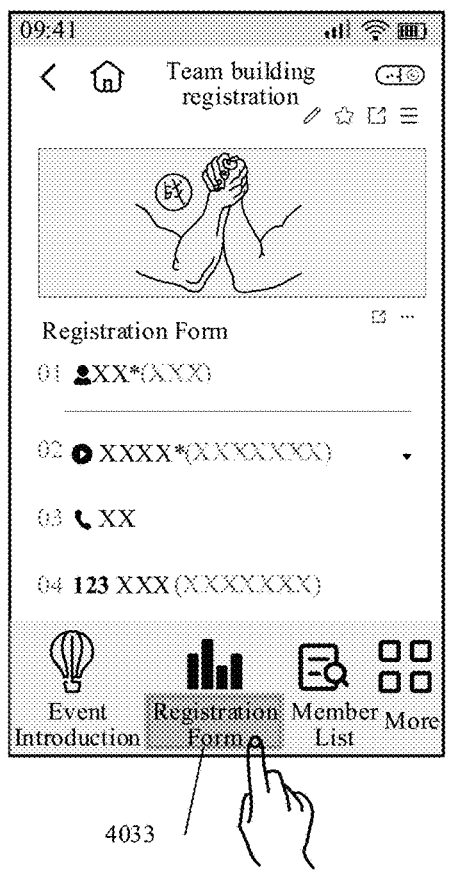
FIG. 4C is a schematic diagram of another editing interface according to an embodiment of this disclosure.
Figure 4D:
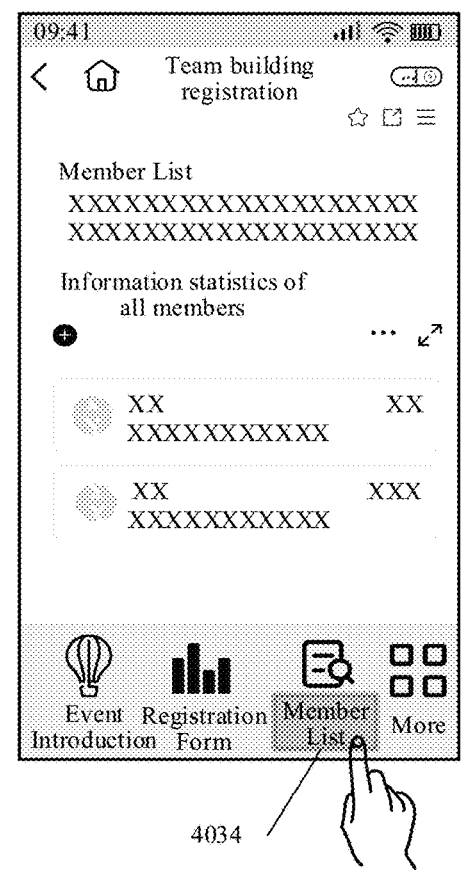
FIG. 4D is a schematic diagram of another editing interface according to an embodiment of this disclosure.

The editing interface shown in FIG. 2 and FIG. 3A to FIG. 3C is merely an implementation of this embodiment of this disclosure. Such an implementation is merely used for describing a composition architecture of the editing interface instead of limiting a presentation manner of the editing interface. For example, although the page list region 2013 is located at a left-side position of the editing interface in FIG. 2 and FIG. 3A to FIG. 3C, a position thereof is not limited in this disclosure. The page list region 2013 may be located at another position of the editing interface. Briefly, there may be another presentation form of the editing interface of this disclosure. For example, FIG. 4A is a schematic diagram of a page list region according to an embodiment of this disclosure. As shown in FIG. 4A, assuming that the scenario type of the first word processing application is a team building registration scenario, the page includes an editing region 401, an identifier 402 of a component center panel, and a page list region 403. When the identifier 402 of the component center panel is selected, a component list included in the component center panel is displayed. The page list region 403 includes titles of a plurality of service pages of the first word processing application, for example, Event Introduction 4032, Registration Form 4033, Member List 4034, and a More identifier 4031. When the More identifier 4031 is selected, titles of all service pages are displayed in the editing region 401. Alternatively, when the Event Introduction 4032 is selected, content corresponding to the title Event Introduction is displayed in the editing region 401, and reference may be made to FIG. 4B. Alternatively, when the Registration Form 4033 is selected, content corresponding to the title Registration Form is displayed in the editing region 401, and reference may be made to FIG. 4C. Alternatively, when the Member List 4034 is selected, content corresponding to the title Member List is displayed in the editing region 401, and reference may be made to FIG. 4D.

In an implementation of this embodiment of this disclosure, at least one target component is presented in the editing region 2011. The target component may be a component selected from the component center panel 2012. The selection process may include: (1) first selecting a candidate component from the component center panel 2012; and (2) determining the candidate component as the target component when the candidate component can be successfully placed in the editing region 2011. In some embodiments, the procedure of selecting at least one component from the component center panel may include: locking at least one candidate component in the component center panel according to a received lock instruction; dragging the locked candidate component along a direction of the editing region according to a received drag instruction, to cause the candidate component to enter into the editing region; and determining the candidate component as the target component when the candidate component is placed in the editing region. The locking a candidate component refers to keeping the cursor of the mouse on the candidate component, and pressing and holding the mouse, so that the candidate component is in a locked state (e.g., when the mouse is moved, the candidate component moves in the display screen in a direction in which the mouse is moved). It may be understood that, when the display screen is a touchscreen, the cursor of the mouse may be a finger, a stylus, or the like of the user, which is not limited in the embodiments of this disclosure. In addition, in the process of dragging the locked candidate component along a direction of the editing region according to a received drag instruction, when there is a free space in the editing region, the candidate component is placed into the free space when the candidate component enters into the editing region. When there is no free space in the editing region, the candidate component is released (e.g., releasing the locked state of the candidate component, and skipping placing the candidate component into the editing region), and prompt information indicating insufficient space is outputted. That there is a free space in the editing region means that a space existing in the editing region has a size that is sufficient for placing the candidate component. That there is no free space in the editing region means that a space existing in the editing region has a size that is insufficient for placing the candidate component. A layout system is deployed on the canvas provided in this embodiment of this disclosure. The layout system may automatically adjust a position and a size of the candidate component and conditionally scale the candidate component according to width and height information of the candidate component, to ensure the style and appearance of the candidate component, and ensure that the target components presented in the editing region do not affect each other. Therefore, when there is no free space in the editing region, the layout system of the canvas may automatically adjust a size or a position of the candidate component, which helps scale the candidate component to a size that can be accommodated by the free space, so that the candidate component is placed in the editing region.

Figure 5:
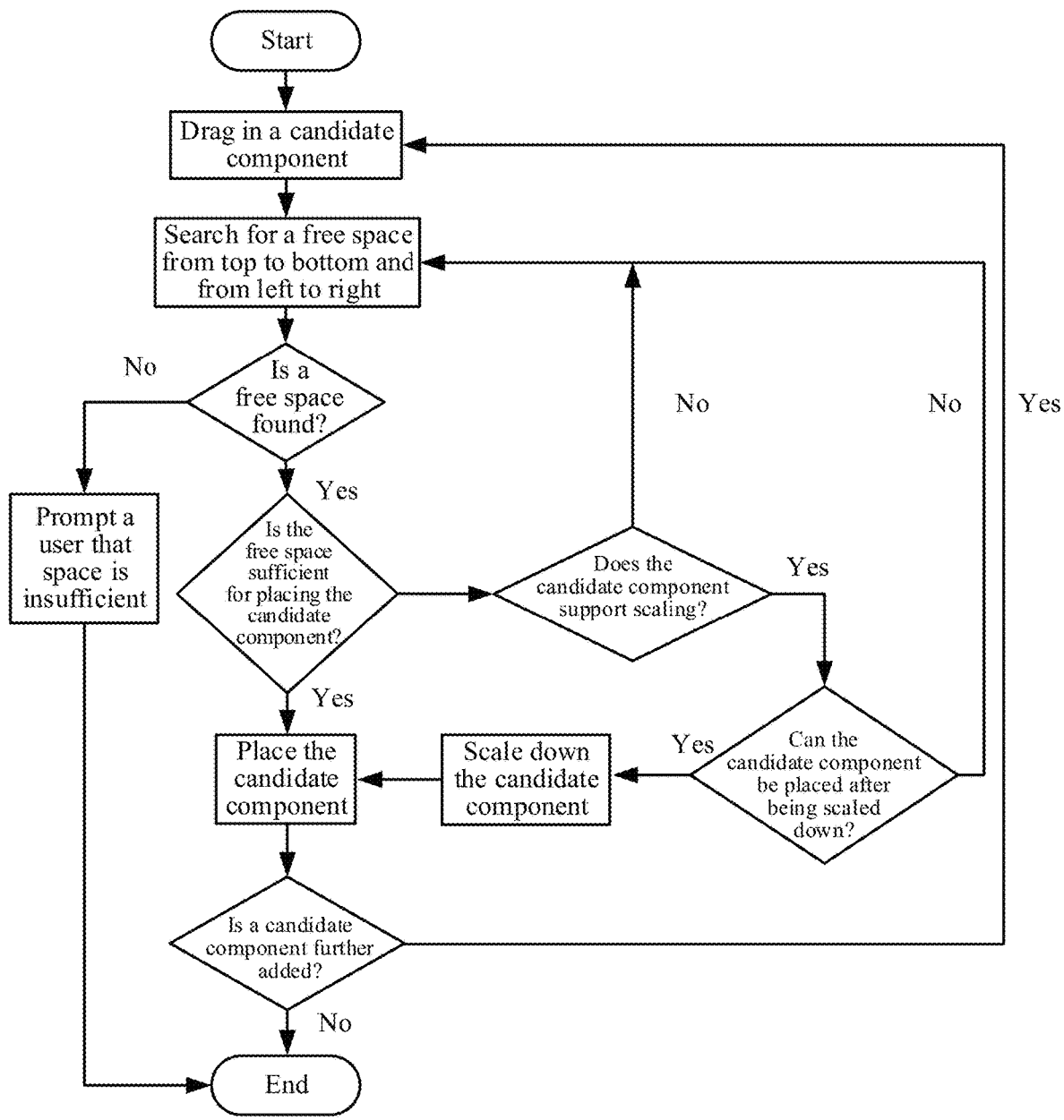
FIG. 5 is a schematic flowchart of placing a candidate component according to an embodiment of this disclosure.

For the foregoing procedure from dragging the candidate component from the component center panel to placing the candidate component into the editing region, reference may be made to FIG. 5. FIG. 5 is a schematic flowchart of placing a candidate component according to an embodiment of this disclosure. As shown in FIG. 5, in response to detecting that there is a candidate component entering the editing region, the terminal device searches the editing region for a free space from top to bottom (or from bottom to top, or the like) and from left to right (or from right to left, or the like). When it is detected that there is a free space in the editing region, whether the free space is sufficient for placing the candidate component is determined. When the free space is sufficient for placing the candidate component, the candidate component is placed in the free space of the editing region. Conversely, when the free space is insufficient for placing the candidate component, whether the candidate component supports scaling is determined. When the candidate component does not support scaling, prompt information is outputted, and the candidate component is released. The prompt information is used for prompting the user that the space of the editing region is insufficient. Alternatively, prompt information is outputted again when it is detected that there is no free space in the editing region. When the candidate component supports scaling, a layout system is adopted to scale the candidate component, and detect whether the scaled candidate component can be placed into the free space. When the scaled candidate component still cannot be placed into the free space, prompt information is outputted. Conversely, when the scaled candidate component can be placed into the free space, the candidate component that has been scaled down is placed into the free space of the editing region. Whether there is a candidate component entering the editing region is further detected, and the foregoing procedure is repeated. In addition, after prompt information prompting the user that there is no free space that can be used for placing the candidate component in the editing region is outputted, the user may configure the candidate component (e.g., adjusting a size, a position, or a style of the candidate component), to enable the candidate component to be placed into the free space and become a target component in the editing region. For example, an original target component in the editing region is deleted, to enlarge the free space. In another example, a position, a style, or the like of the candidate component is adjusted, to help to place the candidate component into the free space. In this embodiment of this disclosure the candidate component is automatically adjusted or manually adjusted, so that a process of placing the candidate component into the editing region is not limited.

In this embodiment of this disclosure, the editing interface used for creating the first word and document processing application includes an editing region, a component center panel, and a page list region. The component center panel includes a component list. The component list includes abundant scenario types and a plurality of components under the scenario types. The page list region supports displaying some titles of the first word and document processing application, and highlighting a title corresponding to content in the editing region, to help the user to browse or editing the first word and document processing application. In this way, a first word and document processing application can be generated by dragging the target component in the component center panel into the editing region and configuring the target component in the editing region, so that the first word and document processing application can appropriately meet actual scenario-based requirements of a user, thereby achieving codeless creation of a word and document processing application and reducing the complexity of creation of a word and document processing application.

Figure 6:
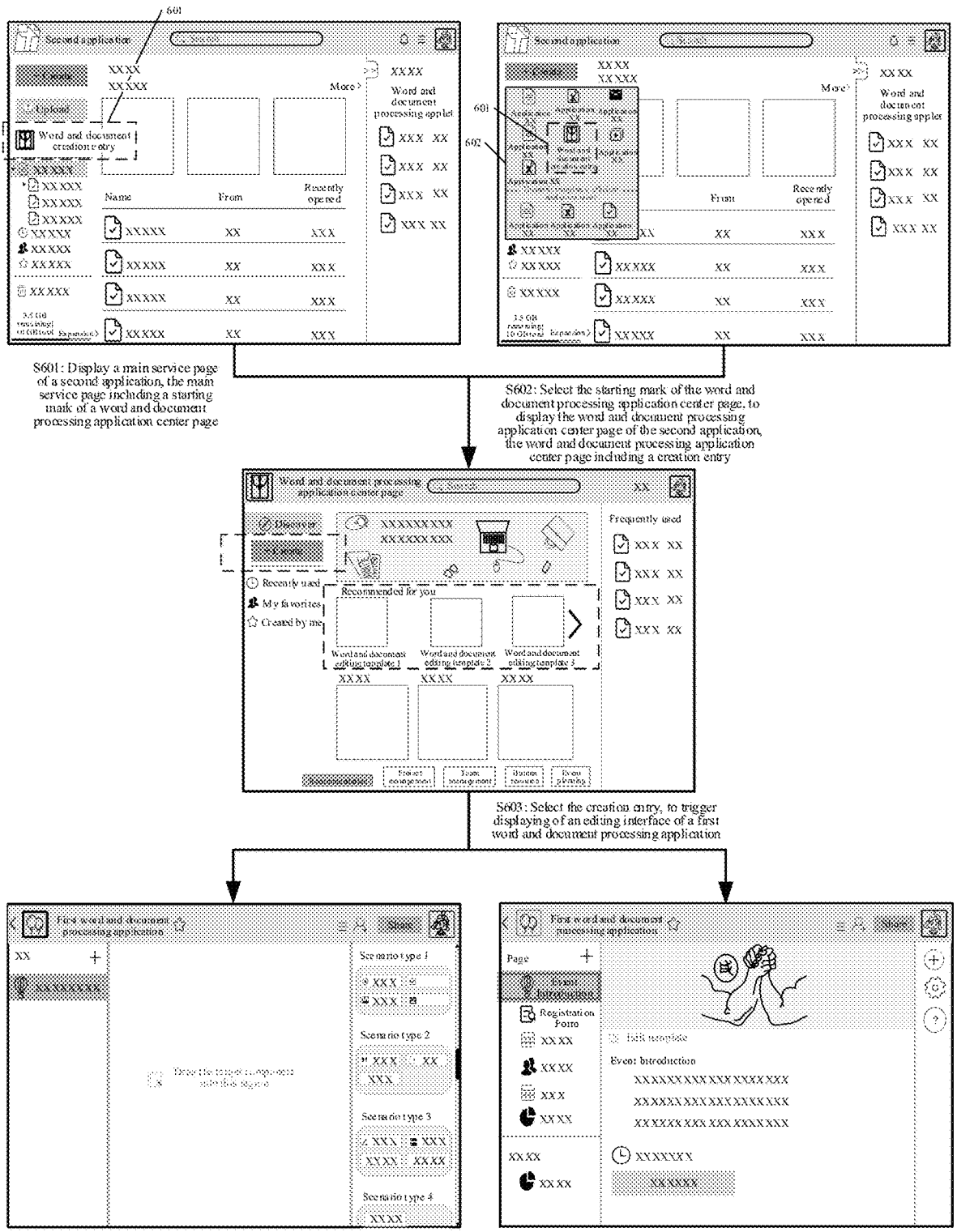
FIG. 6 is a schematic flowchart of a word and document processing method according to an embodiment of this disclosure.

FIG. 6 is a schematic flowchart of a word and document processing method according to an embodiment of this disclosure. The word and document processing method may be performed by the terminal device 101 in the system shown in FIG. 1. The word and document processing method may include the following steps S601 to step S603:

In step S601, a main service page of a second application is displayed, the main service page including a starting mark of a word and document processing application center page.

Figure 7A:
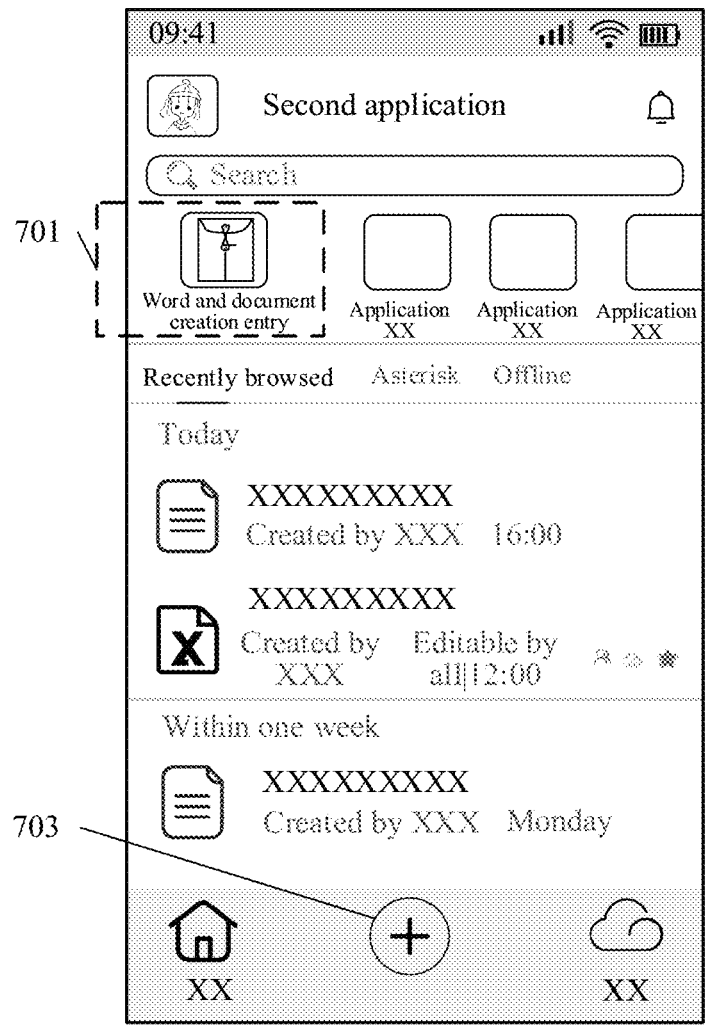
FIG. 7A is a schematic diagram of a starting mark according to an embodiment of this disclosure.

The second application may be any application in the terminal device 101. The second application may be an application (APP) independently installed and run on the terminal device 101, or may be a web application browsed through a browser of the terminal device 101. The second application may include, but is not limited to, an instant messaging application, a web word and/or document processing application, an SNS application, a map application, and the like. In an implementation, the starting mark of the word and document processing application center page is directly displayed in the main service page of the second application. For example, as shown in FIG. 6, a starting mark 601 of a word and document processing application center page is directly displayed in the main service page of the second application. In another example, as shown in FIG. 7A, a starting mark 701 of a word and document processing application center page is directly displayed in the main service page of the second application.

Figure 7B:
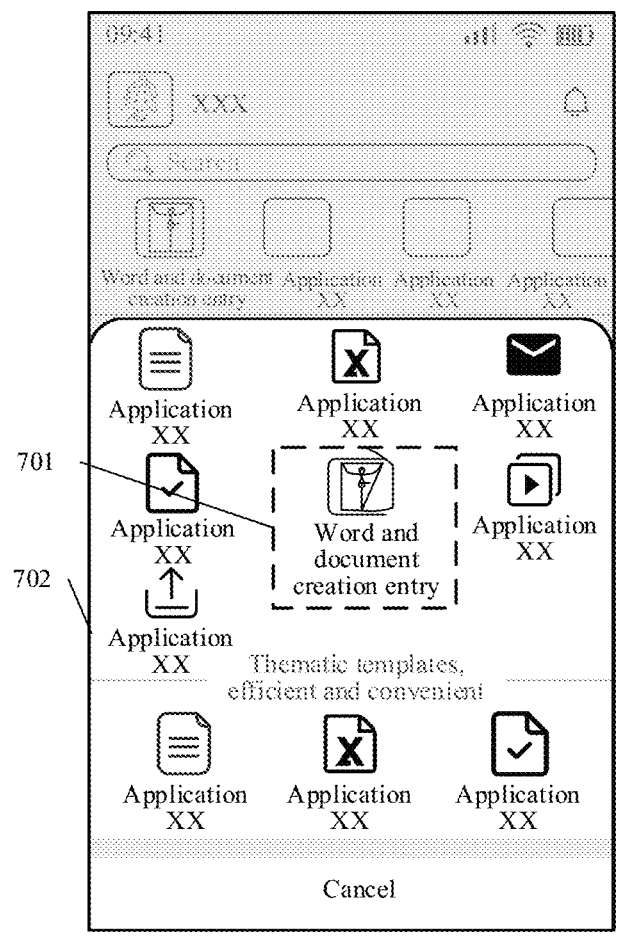
FIG. 7B is a schematic diagram of a starting mark according to an embodiment of this disclosure.

In another implementation, the starting mark of the word and document processing application center page is displayed in a window that belongs to the main service page of the second application, and displaying of a corresponding window is triggered by performing a trigger operation in the main service page of the second application, thereby displaying the starting mark of the word and document processing application center page in the window. For example, as shown in FIG. 6, the main service page of the second application includes a "More" identifier (not shown in the figure). When the "More" identifier is selected, a display window 602 is outputted. The display window 602 includes the starting mark 601 of the word and document processing application center page. In another example, as shown in FIG. 7A, the main service page of the second application includes a "More" identifier 703. When the "More" identifier 703 is selected, displaying of a display window 702 shown in FIG. 7B is triggered, and the starting mark 701 of the word and document processing application center page is displayed in the display window 702.

In step S602, the starting mark of the word and document processing application center page, to display the word and document processing application center page of the second application, the word and document processing application center page including a creation entry.

The starting mark of the word and document processing application center page serves as an entry of triggering displaying of the word and document processing application center page of the second application. When the starting mark of the word and document processing application center page is chosen or selected, displaying of the word and document processing application center page of the second application is triggered. The word and document processing application center page includes a creation entry. The creation entry serves as an entry of triggering displaying of the first word and document processing application. When the creation entry is selected, displaying of the editing interface of the first word and document processing application is triggered. The editing interface of the first word and document processing application may include a template component, and may also include a component selected from the component center panel. A source of the target component in the editing interface of the first word and document processing application is described below.

Figure 8A:
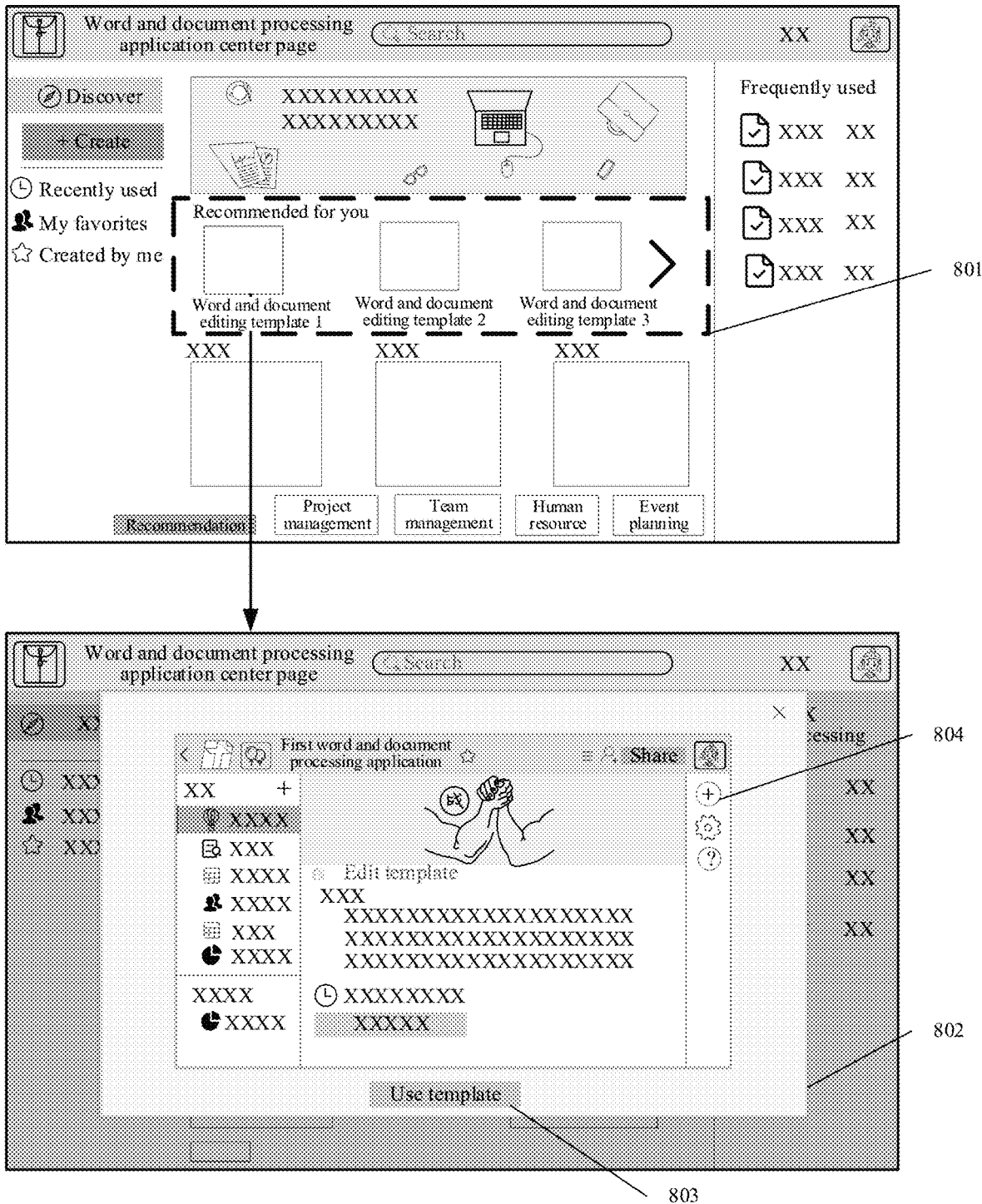
FIG. 8A is a schematic diagram of determining an editing interface of a first word and document processing application according to an embodiment of this disclosure.
Figure 8B:
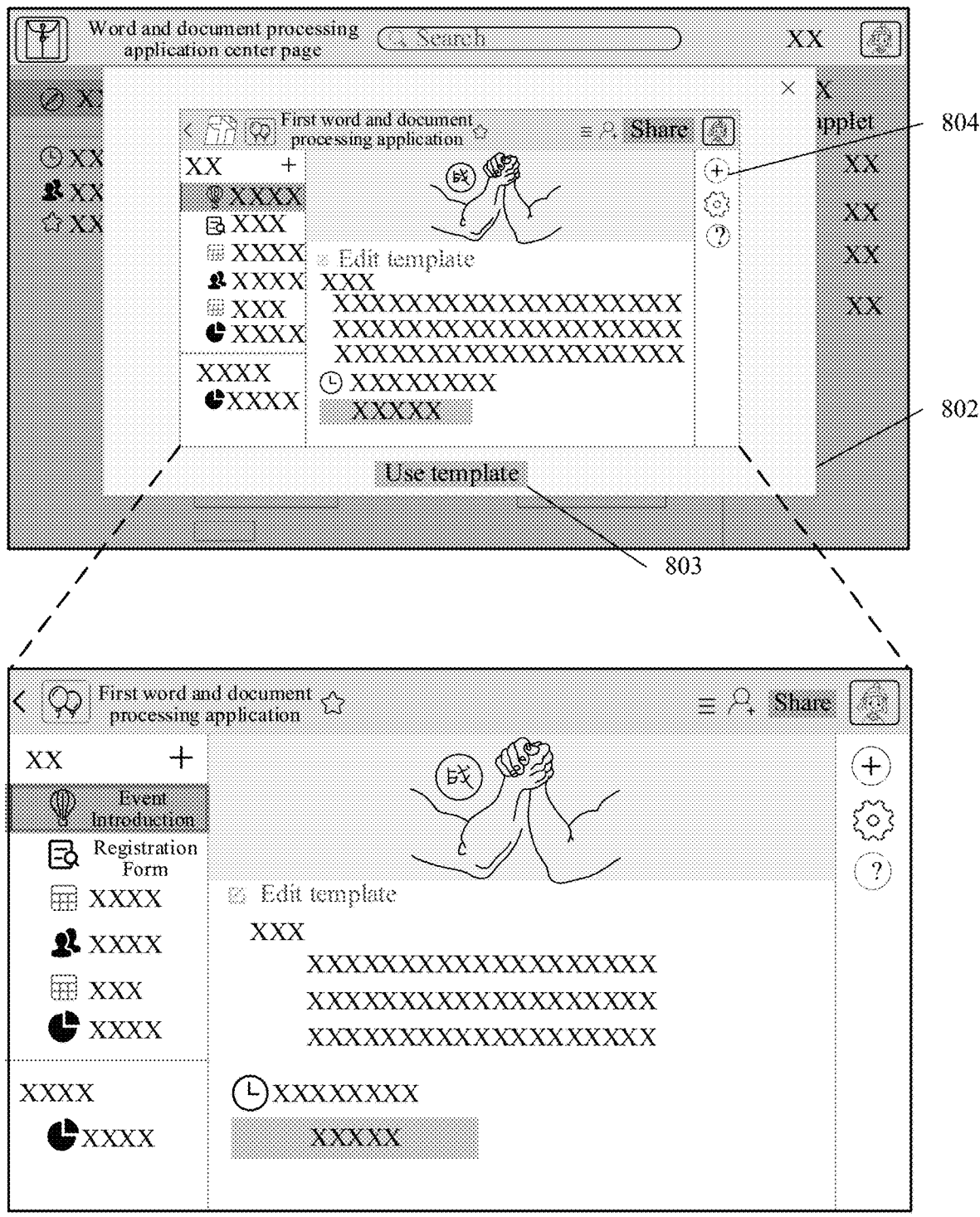
FIG. 8B is a schematic diagram of determining an editing interface of a first word and document processing application according to an embodiment of this disclosure.
Figure 9:
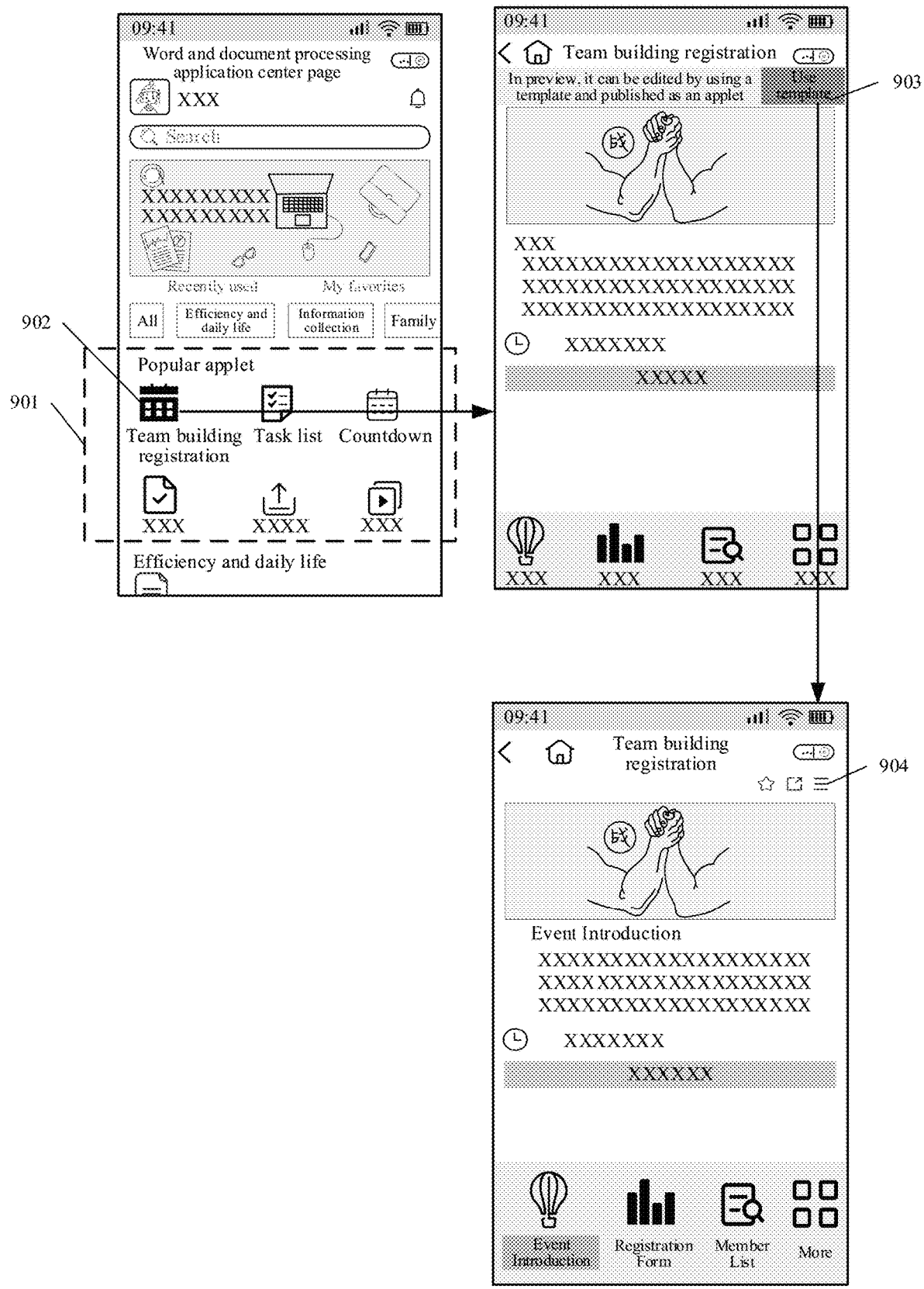
FIG. 9 is a schematic diagram of determining an editing interface of a first word and document processing application according to an embodiment of this disclosure.

In an implementation, the editing interface of the first word and document processing application is displayed according to a style of the target word and document editing template. In some embodiments, the word and document processing application center page includes at least one scenario type and a word and document editing template (e.g., a word and/or document editing template) under each scenario type. The word and document editing template includes at least one template component. When the target word and document editing template in the word and document processing application center page is selected, a template component of the target word and document editing template is displayed in a preview mode. The target word and document editing template can be any word and/or document editing template in the word and document editing template. In this case, the creation entry refers to a "use confirmation option" in a preview page of the target word and document editing template. When creation of the first word and document processing application is triggered by selecting the "use confirmation option", an editing region in the editing interface of the first word and document processing application of which displaying is triggered includes the template component of the target word and document editing template. For example, FIG. 8A is a schematic diagram of determining an editing interface of a first word and document processing application according to an embodiment of this disclosure. FIG. 8B is a schematic diagram of determining an editing interface of a first word processing application according to an embodiment of this disclosure. As shown in FIG. 8A, the word and document processing application center page of the second application includes a word and document editing template region 801. The word and document editing template region 801 includes different scenario types and a word and document editing template under each scenario type. For example, the word and document editing template region 801 includes a word and document editing template 1 under a team building registration scenario, a word and document editing template 2 under a task list scenario, a word and document editing template 3 under a countdown scenario, . . . , and a plurality of word and document editing templates may be included under the same scenario type. This is not limited in the embodiments of this disclosure. When any word and document editing template (e.g., the team building registration scenario) in the word and document editing template region 801 is selected, a preview page 802 is displayed. A template component included in the team building registration scenario is displayed in the preview page 802. In this case, the creation entry refers to a use confirmation option (e.g., a template using option 803) in a preview page of the target word and document editing template. Referring to FIG. 8B, when creation of the first word and document processing application is triggered by selecting the use confirmation option, the editing region in the editing interface of the first word and document processing application of which displaying is triggered includes the template component of the target word and document editing template. When the first word and document processing application displays the template component in the target word and document editing template, the first word and document processing application still supports the user to drag the target component from the component center panel to the editing interface of the first word and document processing application. In this way, the first word and document processing application that meets user requirements is created. In some embodiments, the component center panel included in the editing interface of the target word and document editing template includes a target identifier 804. When the target identifier 804 is selected, the component list is displayed in the component center panel. A plurality of scenario types and a plurality of components under the scenario types are displayed in the component list. A plurality of components belonging to a same scenario type as the template component included in the target word and document editing template may be combined and arranged before other components (e.g., when the components are arranged from top to bottom, the plurality of components belonging to the same scenario type as the template component included in the target word and document editing template are combined and arranged above the other components). The other components may include a component not belonging to the same scenario type as the template component included in the target word and document editing template. In this way, the components related to the target word and document editing template can be highlighted, which is convenient for the user to observe and obtain such components. Likewise, this embodiment of this disclosure further provides another schematic interface diagram of respective parts of selecting a target word and document editing template from the word and document editing template. FIG. 9 is a schematic diagram of determining an editing interface of a first word and document processing application according to an embodiment of this disclosure. As shown in FIG. 9, a word and document editing template region 901 is displayed in the word and document processing application center page. The word and document editing template region 901 includes different scenario types and a word and document editing template under each scenario type. For example, the word and document editing template region 901 includes a word and document editing template 1 under a team building registration scenario, a word and document editing template 2 under a task list scenario, a word and document editing template 3 under a countdown scenario, etc. When a team building registration scenario 902 is selected, displaying of a preview page of a word and document editing template corresponding to the team building registration scenario is triggered. The preview page includes a use confirmation identifier (e.g., "Use template" 903). When the "Use template" 903 is selected, the editing region of the editing interface of the first word and document processing application of which displaying is triggered includes the template component of the target word and document editing template. In addition, the editing interface of the first word and document processing application includes an identifier 904. When the identifier 904 is selected, the component center panel is displayed.

Figure 10:
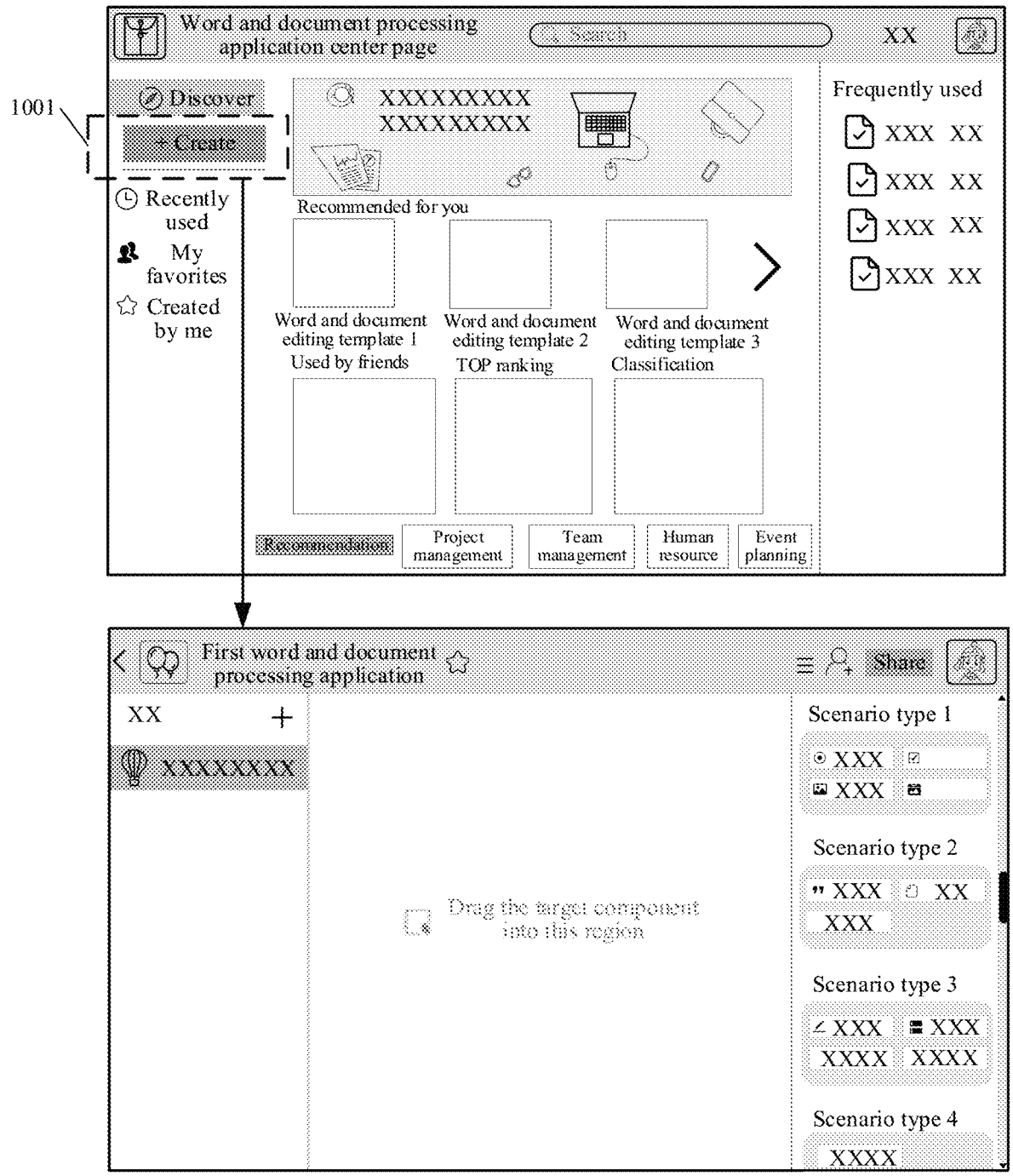
FIG. 10 is a schematic diagram of publishing a first word and document processing application according to an embodiment of this disclosure.
Figure 11:
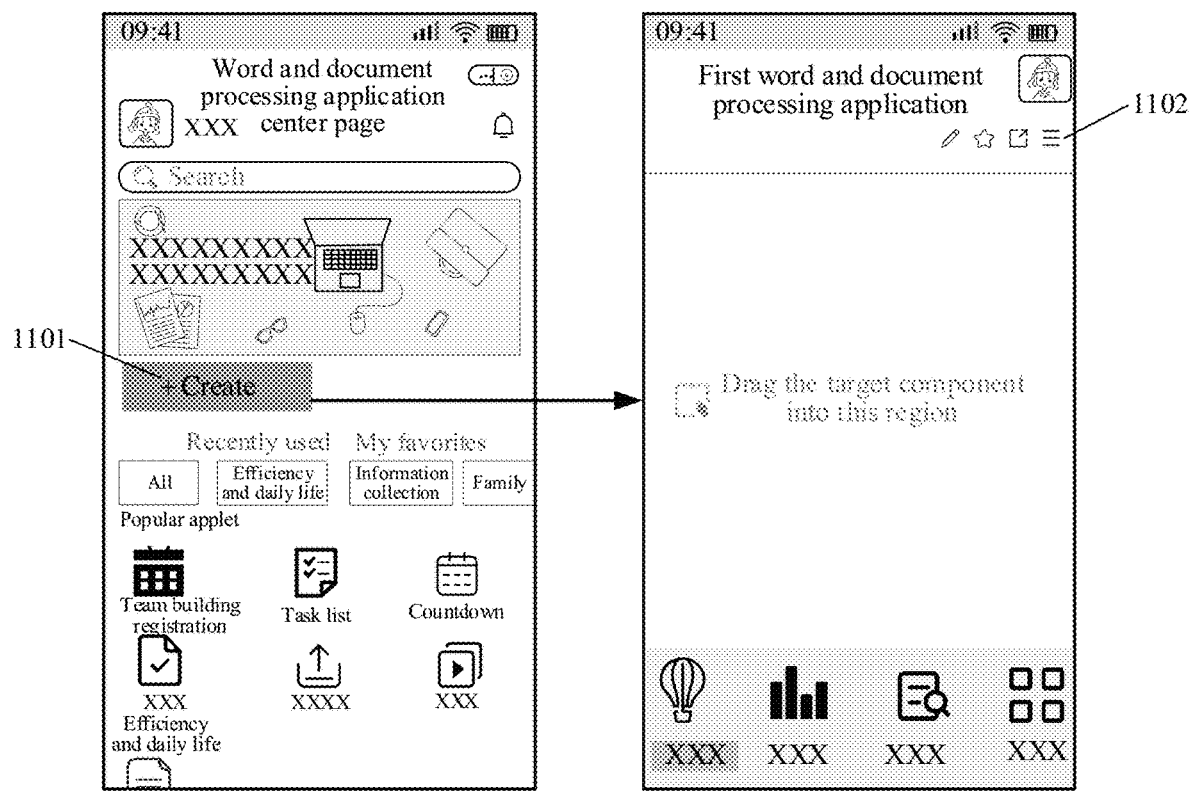
FIG. 11 is a schematic diagram of determining an editing interface of a first word and document processing application according to an embodiment of this disclosure.

In another implementation, the creation entry refers to a create option in the word and document processing application center page. When creation of the first word and document processing application is triggered by selecting the create option, an editing region in the editing interface of the first word and document processing application of which displaying is triggered is a blank region. In some embodiments, the word and document processing application center page includes a create option. When the create option is selected, displaying of the editing interface of the first word and document processing application is triggered. The editing interface of the first word and document processing application is a blank region. The user may drag, according to a scenario type, a target component under the scenario type from the component center panel, to create the first word and document processing application that meets scenario-based requirements. In this way, each user becomes a creator of a solution to the scenario problem by creating the first word and document processing application, thereby enhancing the user's sense of belonging and participation in the product used for creating the first word and document processing application, and improving the user experience. For example, FIG. 10 is a schematic diagram of determining an editing interface of a first word and document processing application according to an embodiment of this disclosure. As shown in FIG. 10, the word and document processing application center page includes a create option 1001. When the create option 1001 is selected, displaying of the editing interface of the first word and document processing application is triggered. The editing interface is a blank interface. Likewise, a component center panel included in the editing interface of the target word and document editing template includes a target identifier. When the target identifier is selected, a component list is displayed in the component center panel. A plurality of scenario types and a plurality of components under the scenario types are displayed in the component list. Likewise, this embodiment of this disclosure further provides another schematic diagram of a first word and document processing application of which a newly created editing region is a blank region. FIG. 11 is a schematic diagram of determining an editing interface of a first word and document processing application according to an embodiment of this disclosure. As shown in FIG. 11, a word and document processing application center page includes a create option 1101. When the create option 1101 is selected, an editing region in the editing interface of the first word and document processing application of which displaying is triggered is displayed as a blank region.

In step S603, the creation entry is selected, to trigger displaying of the editing interface of the first word and document processing application.

Based on the foregoing descriptions, for different creation entries, different editing interfaces of the first word and document processing application are displayed. For details, reference may be made to related descriptions of the specific implementation process described in step S602, and details are not described herein again.

In conclusion, after step S601 to step S603 described in FIG. 6 are performed in this embodiment of this disclosure, the editing interface of the first word and document processing application can be obtained. Then, step S201 to S203 described in FIG. 2 are performed, to generate the first word and document processing application. In a process of creating the first word and document processing application (e.g., performing the process of step S203 described in FIG. 2), after the editing interface of the first word and document processing application is configured, a service page of the first word and document processing application is constituted by a layout and content of a target component in the editing region that is configured. The service page of the first word and document processing application includes a return option. When the return option is selected, it is switched from the first word and document processing application to a main service page of a second application.

In this embodiment of this disclosure, first, the main service page of the second application includes a starting mark of a word and document processing application center page. When the starting mark is selected, the word and document processing application center page of the second application is displayed. A creation entry for a word and document processing application is set in the word and document processing application center page. Displaying of the editing interface of the first word and document processing application can be triggered by selecting the creation entry. In addition, when different creation entries are selected, the editing interfaces of the first word and document processing application are different, thereby enhancing the abundance of the editing interfaces of the first word and document processing application. Second, a service page of the first word and document processing application includes a return option, so that the first word and document processing application and the main service page of the second application may be switched to each other for displaying, thereby improving the simplicity of the operations.

In this embodiment of this disclosure, after the first word and document processing application is created, publishing and sharing of the first word and document processing application are supported. After a publishing operation is performed on the first word and document processing application, an identifier of the first word and document processing application may be presented in the main service page of the second application. After a sharing operation is performed on the first word and document processing application, the first word and document processing application may be presented in a session window between a sharer and a sharee in a form of a message (e.g., in a form of a notification message), so that the sharee can access the first word and document processing application through the notification message. An execution procedure of the publishing operation and an execution procedure of the sharing operation are respectively described below in detail:

(1) Publish a first word and document processing application.

Figure 12:
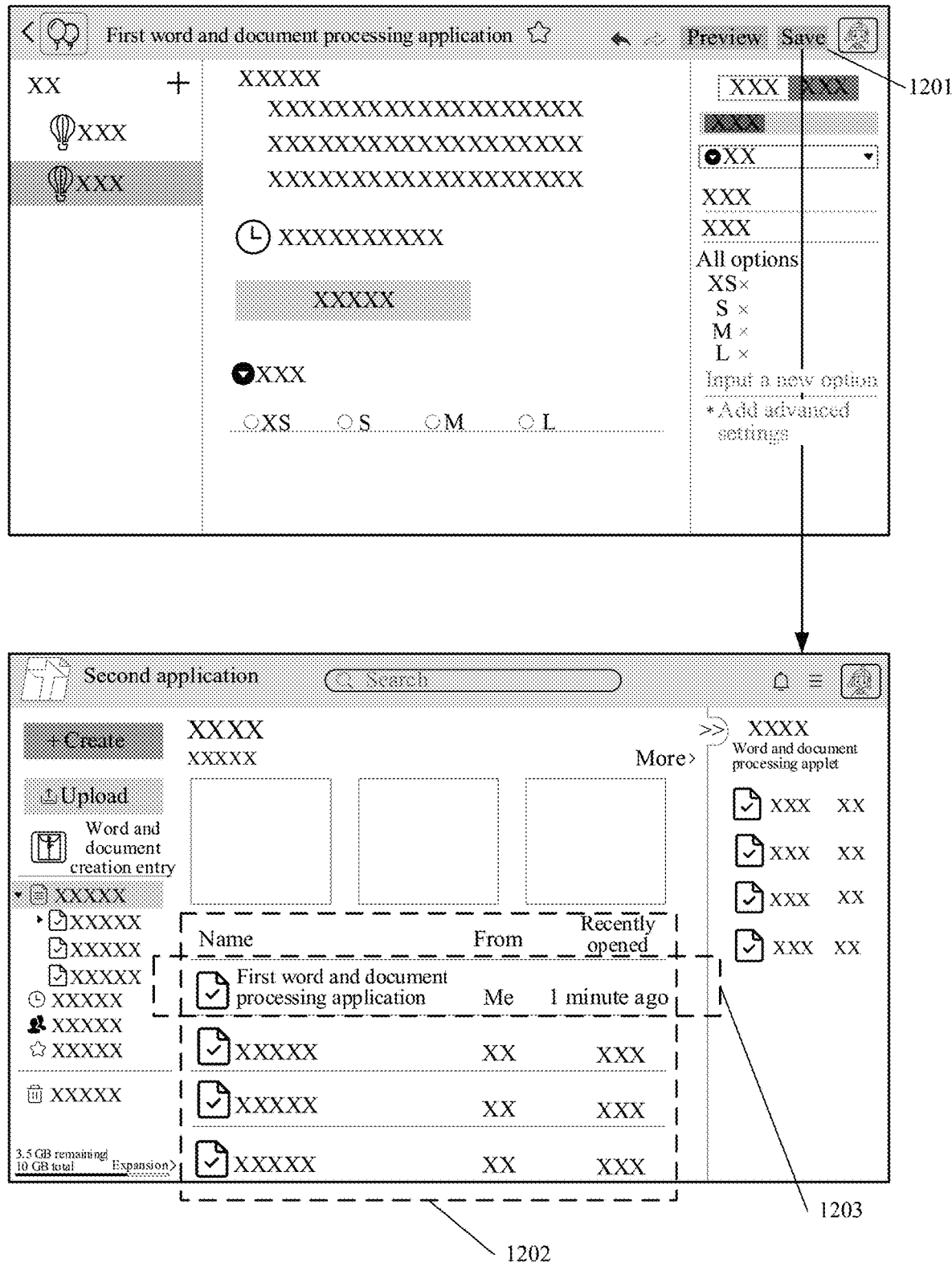
FIG. 12 is a schematic diagram of publishing a first word and document processing application according to an embodiment of this disclosure.

A manner of publishing the first word and document processing application may include at least one of the following:

(1) A target component in an editing region is saved according to a period to publish the first word and document processing application. The period herein may be a system preset period or a period set by the user. For example, the period is 5 seconds, 6 seconds, 8 seconds, or the like, which is not limited in this embodiment of this disclosure. For example, after displaying the editing interface of the first word and document processing application, the terminal device saves a target component in an editing region according to a period (which may be understood as saving the first word and document processing application). When the first word and document processing application is successfully saved, it indicates that first word and document processing application is successfully published. When publishing is implemented by performing saving according to a period, the first successful saving indicates that the first word and document processing application is successfully released, and the published first word and document processing application is updated every time saving is performed. ②
The editing interface of the first word and document processing application includes a publish button. When the publish button is selected, the first word and document processing application is published. For example, FIG. 12 is a schematic diagram of publishing a first word and document processing application according to an embodiment of this disclosure. As shown in FIG. 12, the editing interface of the first word and document processing application includes a save button 1201 (e.g., the publish button). When the user selects the save button 1201, the terminal device publishes the first word and document processing application.

That the terminal device publishes the first word and document processing application may include: The terminal device sends a publishing request to the server. The publishing request carries a layout and content of a target component after the editing interface of the first word and document processing application is configured. That is, the publishing request carries an architecture and content of a service page of the first word and document processing application. The server stores the architecture and the content of the service page of the first word and document processing application, and assigns an access link to the first word and document processing application. The access link is used for indicating a storage position of the first word and document processing application on the server side. The server returns the access link to the terminal device. The terminal device receives the access link of the first word and document processing application, which means that the first word and document processing application is successfully published. The terminal device sends an update request to the server. The update request carries the access link of the first word and document processing application and updated content, to cause the server to update the published first word and document processing application synchronously, thereby ensuring that the latest content of the first word and document processing application can be accessed when the first word and document processing application is accessed through the access link. In addition, after the first word and document processing application is successfully published, the server and the terminal device display an identifier 1203 of the first word and document processing application in a word and document processing application list 1202 included in the main service page of the second application. The word and document processing application list 1202 includes identifiers of word and document processing applications that have been historically created and successfully published. When the user selects an identifier of any word and document processing application in the word and document processing application list 1202, a service interface of the word and document processing application corresponding to the selected identifier of the word and document processing application may be switched to for displaying. When the user has a component configuration permission or a content filling permission of the selected word and document processing application, component configuration or content filling may be performed on the service page component of the selected word and document processing application. When the user only has a browsing permission of the selected word and document processing application, the user can only browse content in the service page of the word and document processing application.

Figure 13:
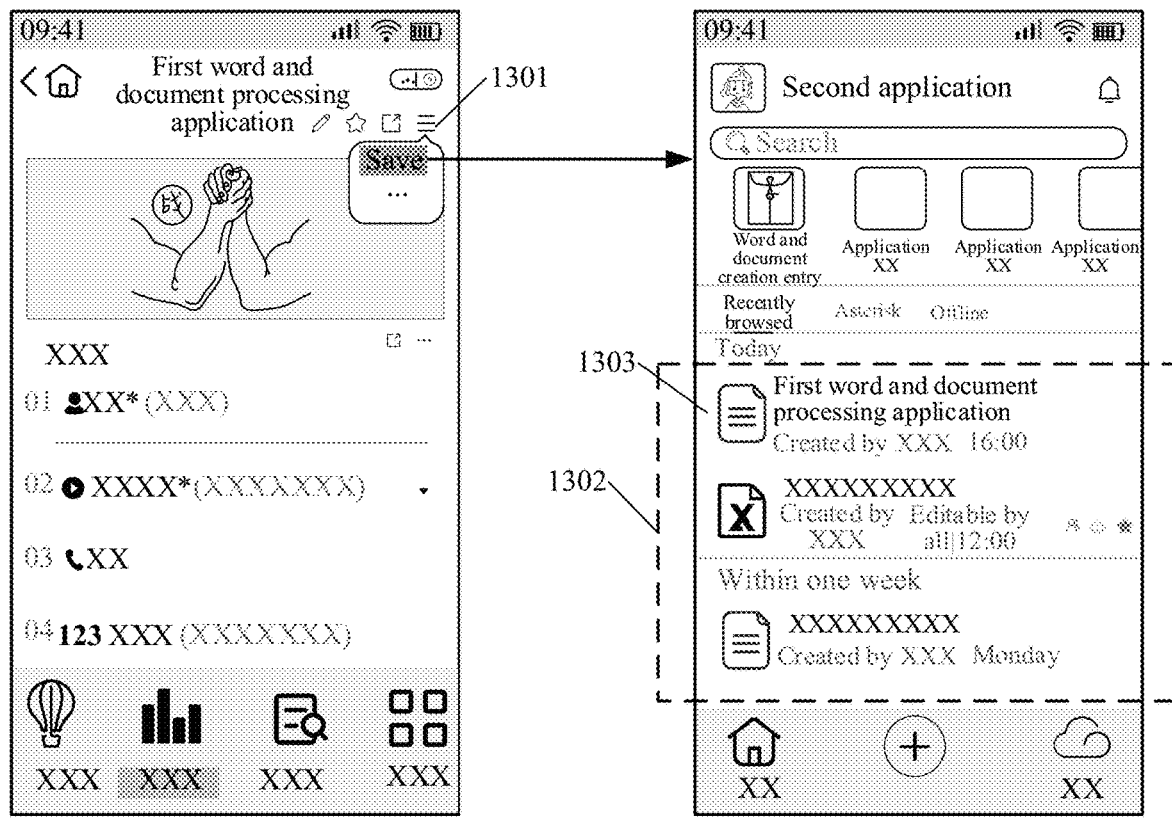
FIG. 13 is a schematic diagram of publishing a first word and document processing application according to an embodiment of this disclosure.

The schematic diagram of pages in the procedure of publishing the first word and document processing application shown in FIG. 12 is merely an implementation of this embodiment of this disclosure. Such an implementation is merely used for describing exemplary composition architectures of pages involved in the procedure of publishing the first word and document processing application, and is not intended to limit presentation forms of the pages. For example, although the save button 1201 in FIG. 12 is located in the upper right corner of the page, a display position thereof is not limited in this disclosure. The save button 1201 can also be located at another position of the editing interface. In another example, the word and document processing application list 1202 in the main service page of the second application is located in the middle position of the page, but the word and document processing application list 1202 may also be located at another position in the main service page of the second application. Briefly, in this disclosure, the pages involved in the procedure of publishing the first word and document processing application may have other representation forms. For example, FIG. 13 is a schematic diagram of publishing a first word and document processing application according to an embodiment of this disclosure. A More identifier 1301 is displayed in the editing interface of the first word and document processing application. When the More identifier 1301 is selected, an option bar is outputted, a save button is located in the option bar. When the user clicks the save button, an identifier 1303 of the first word and document processing application is displayed in a word and document processing application list 1302 of which displaying is triggered in the main service page of the second application. The word and document processing application list 1302 further includes identifiers of word and document processing applications that are historically created and successfully published or browsed by the user. When an identifier of any word and document processing application in the word and document processing application list 1302 is selected, displaying of an editing interface of the selected word and document processing application is triggered. In this case, the user may continue to perform an operation, such as editing target content, or configuring a target component, in the editing interface of the word and document processing application.

The operation of publishing the first word and document processing application can occur at any part of the word and document processing solution. For example, after the target component is dragged from the component center panel to the editing region, the operation of publishing the first word and document processing application may be performed. In another example, after the target component is configured in the editing region, the operation of publishing the first word and document processing application may be performed, and so on. This is not limited in this embodiment of this disclosure.

(2) Share the first word and document processing application.

The so-called sharing the first word and document processing application refers to sharing the first word and document processing application to a shared object, so that shared object can perform an operation, such as browsing or editing, on the first word and document processing application.

Figure 14:
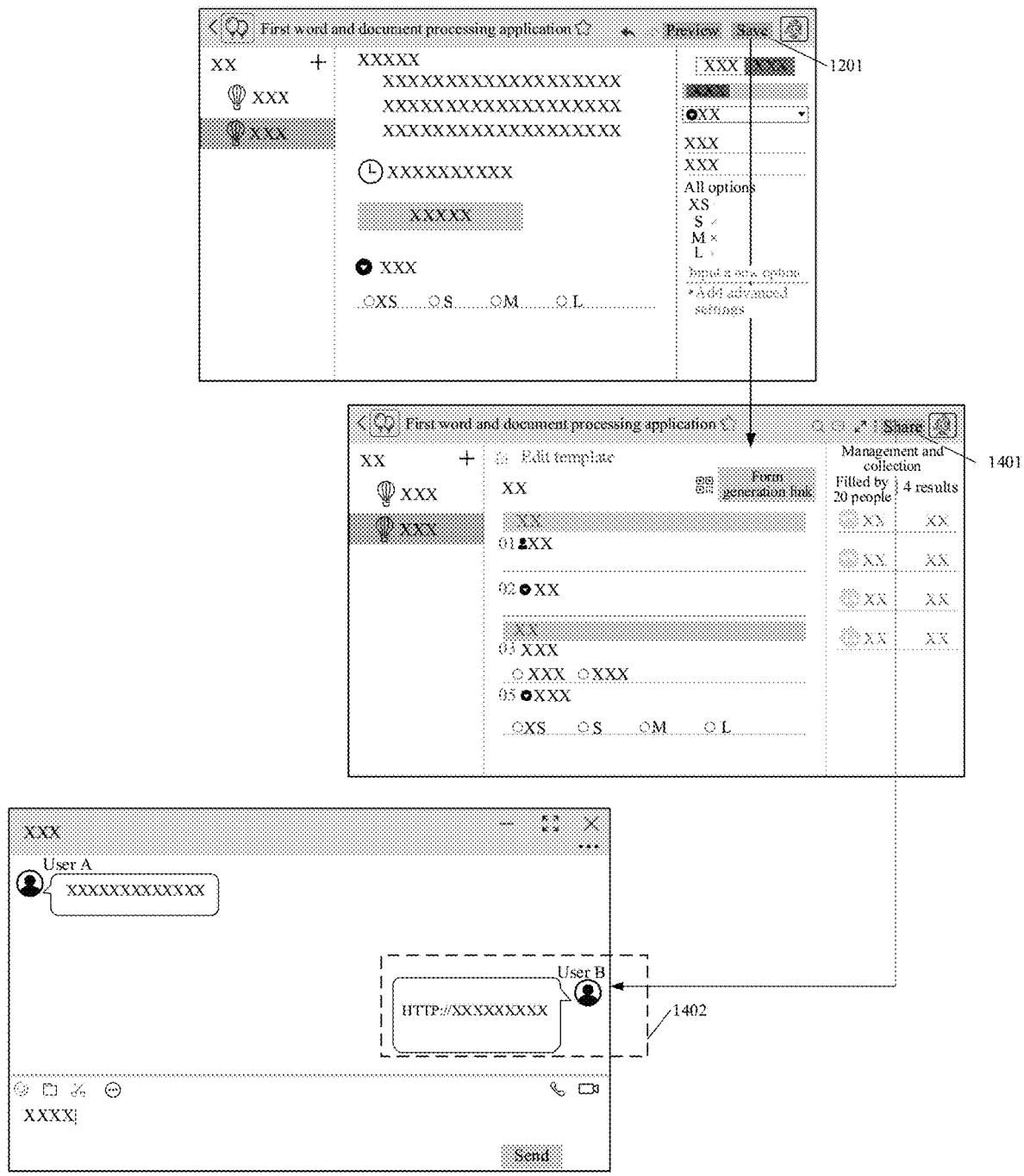
FIG. 14 is a schematic diagram of sharing a first word and document processing application according to an embodiment of this disclosure.
Figure 15:
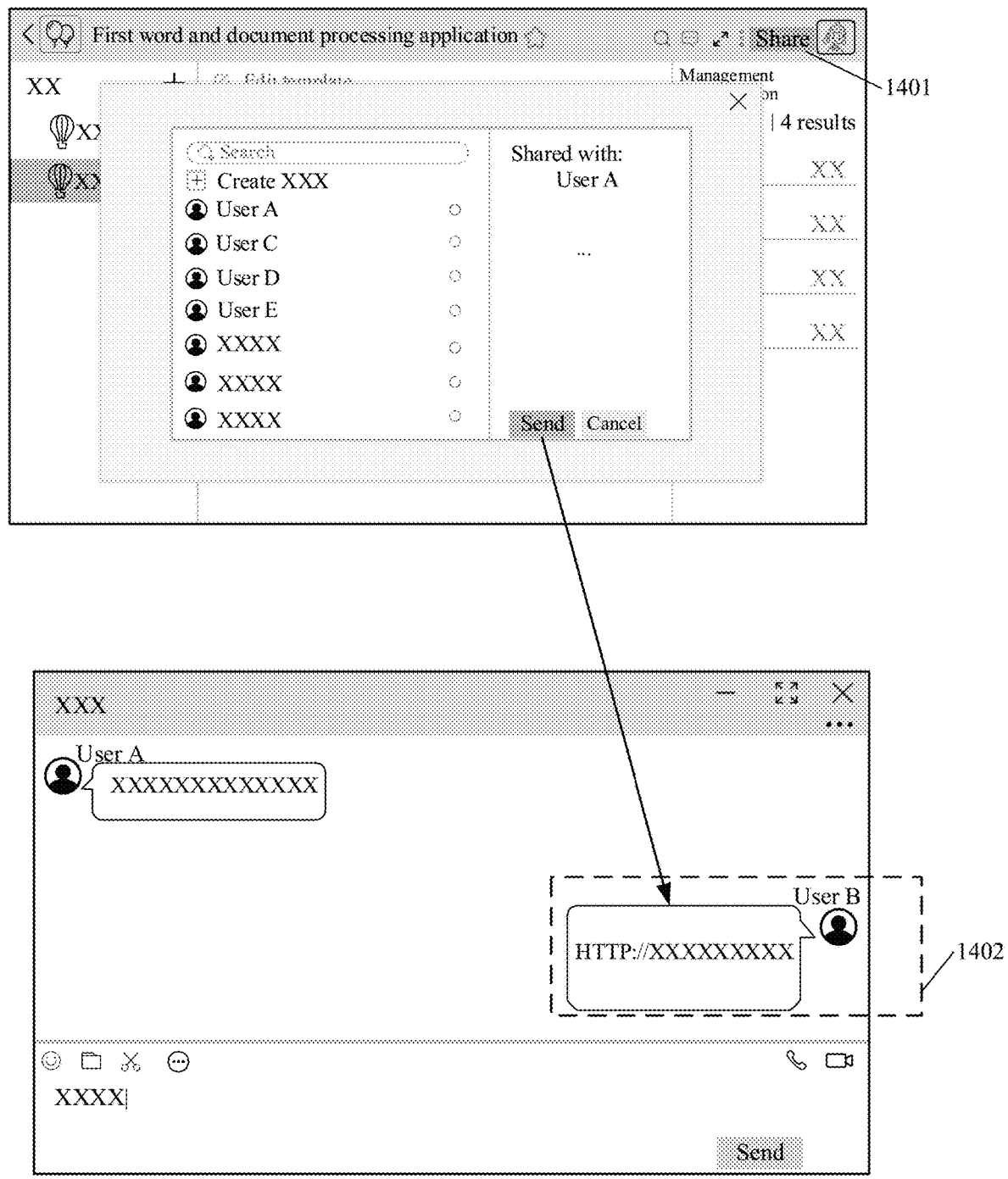
FIG. 15 is a schematic diagram of a list of shared objects according to an embodiment of this disclosure.

In an implementation, a service page of the first word and document processing application is constituted by a layout and content of a target component in the editing region that is configured. After the first word and document processing application is successfully published, the first word and document processing application includes an access link such as a uniform resource locator (URL) or a two-dimensional barcode. In addition, a sharing entry is set in the service page of the first word and document processing application. In this case, an execution procedure of sharing the first word and document processing application may include: selecting a sharing entry set in a service page of first word and document processing application, and triggering displaying of a list of shared objects, the list of shared objects including at least one shared object; and displaying, when a target shared object in the list of shared objects is selected, a notification message in a session window between a sharer and the target shared object, the notification message carrying an access link of the first word and document processing application. Correspondingly, when the notification message is selected in the session window, the first word and document processing application can be accessed based on the access link of the first word and document processing application. FIG. 14 is a schematic diagram of sharing a first word and document processing application according to an embodiment of this disclosure. As shown in FIG. 14, the editing interface of the first word and document processing application includes a save button 1201. When the save button 1201 is selected, the first word and document processing application is published. After the first word and document processing application is successfully published, the first word and document processing application includes an access link. In this case, the service page of the first word and document processing application includes a sharing entry 1401. When the sharing entry 1401 is selected, a list of shared objects is outputted. For a schematic diagram of the list of shared objects, reference may be made to FIG. 15. FIG. 15 is a schematic diagram of a list of shared objects according to an embodiment of this disclosure. As shown in FIG. 15, the list of shared objects includes at least one shared object. The shared object may be an individual user, a group, followers in Moments, or the like. If a target shared object is selected from the list of shared objects, the notification message is sent to the target shared object. That is, a notification message 1402 is displayed in a session window between the sharer and the target shared object. The notification message 1402 carries the access link of the first word and document processing application. The list of shared objects may be located in a window popped up from the first word and document processing application (as shown in FIG. 15), or may be displayed in the display screen as an individual page, which is not limited in this embodiment of this disclosure.

Figure 16:
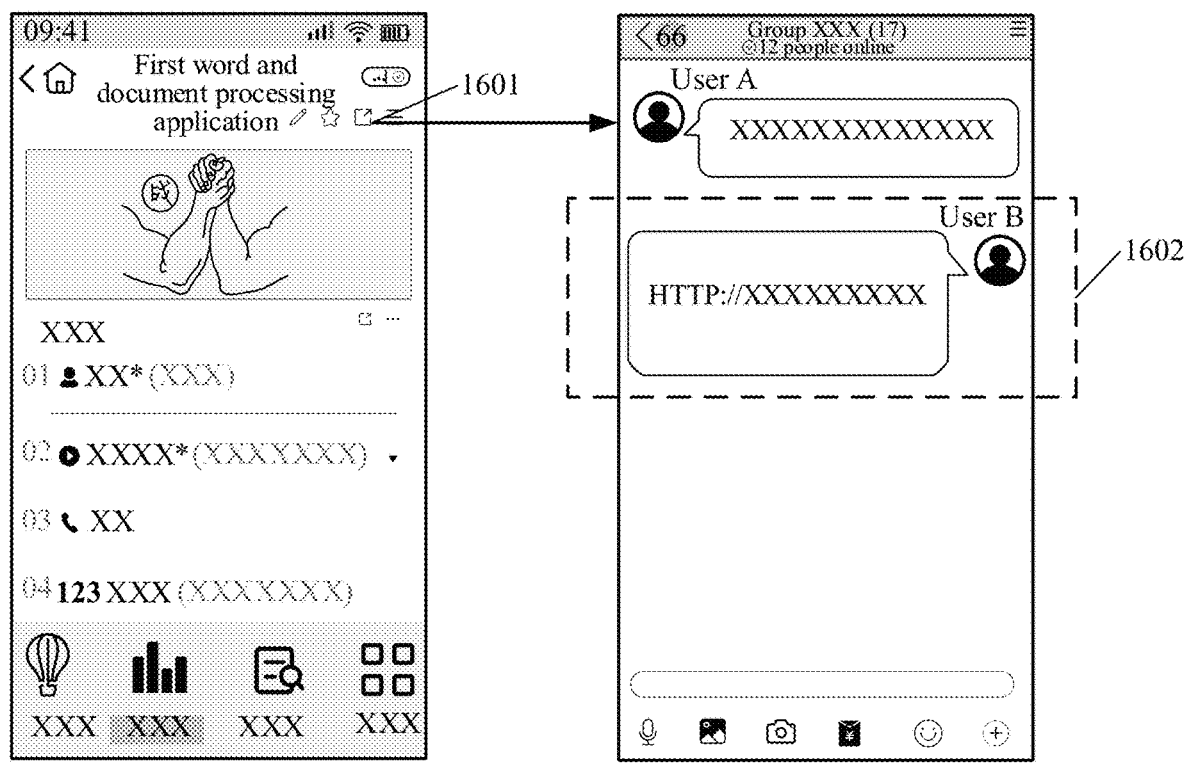
FIG. 16 is a schematic diagram of sharing a first word and document processing application according to an embodiment of this disclosure.
Figure 17:
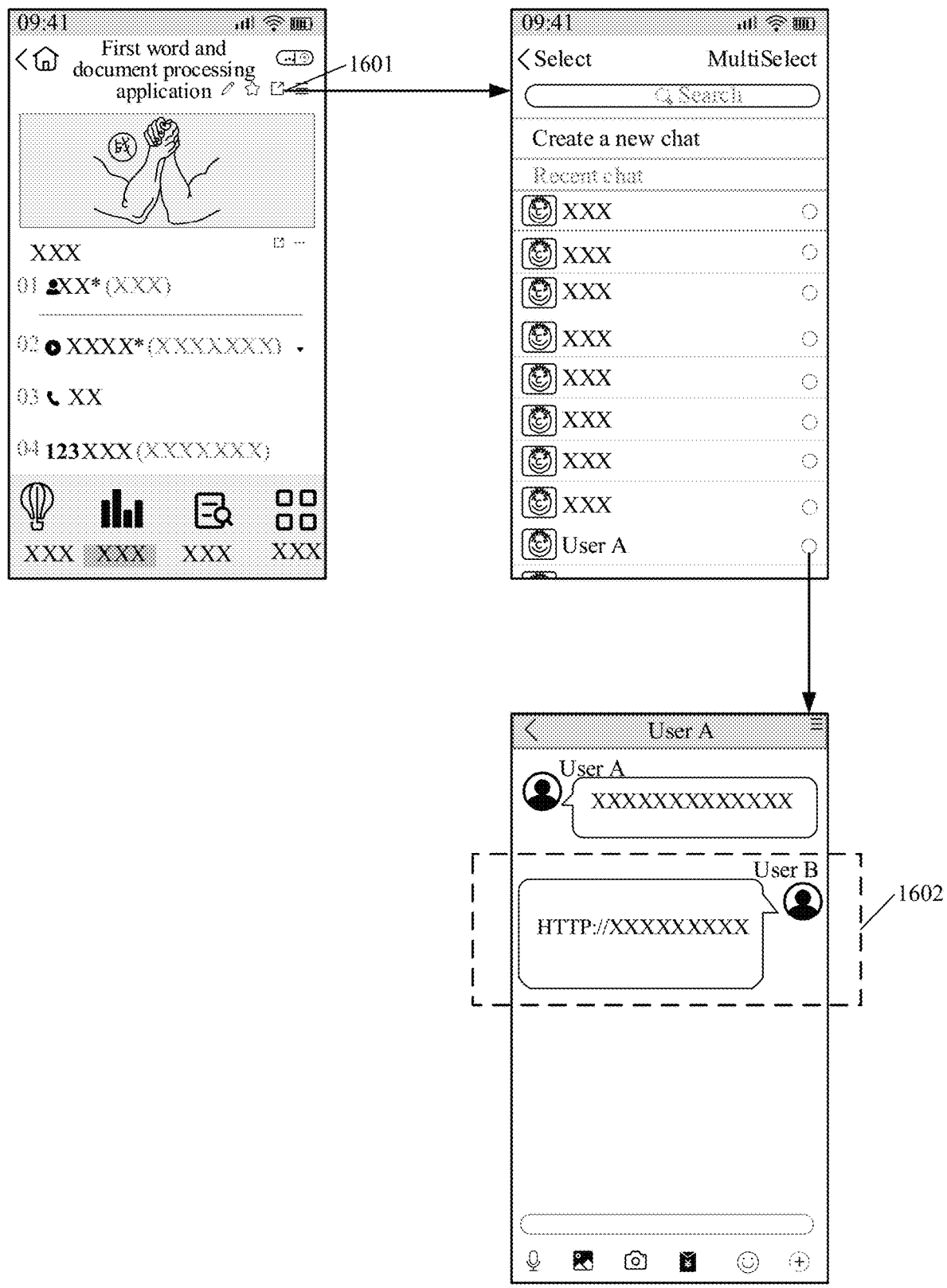
FIG. 17 is a schematic diagram of a list of shared objects according to an embodiment of this disclosure.

The schematic diagrams of pages in the procedure of sharing the first word and document processing application shown in FIG. 14 and FIG. 15 are merely an implementation of this embodiment of this disclosure. Such an implementation is merely used for describing exemplary composition architectures of pages involved in the procedure of sharing the first word and document processing application, and is not intended to limit presentation forms of the pages. For example, although the save button 1201 in FIG. 14 is located in the upper right corner of the page, a display position thereof is not limited in this disclosure. The save button 1201 can also be located at another position of the editing interface. In another example, although a share button 1401 is located in the upright corner of the editing interface of the first word and document processing application, the share button 1401 may also be located at another position in the editing interface of the first word and document processing application. In still another example, in the interface diagram shown in FIG. 15, when the share button 1401 is clicked, although the list of shared objects is displayed in a form of a window on the editing interface of the first word and document processing application, the list of shared objects may also be displayed in the display screen as an individual page, and so on. Briefly, in this disclosure, the pages involved in the procedure of sharing the first word and document processing application may have other representation forms. For example, FIG. 16 is a schematic diagram of sharing a first word and document processing application according to an embodiment of this disclosure. As shown in FIG. 16, a share button 1601 is directly displayed in the editing interface of the first word processing application. When the share button 1601 is selected, a list of shared objects is outputted. For a schematic diagram of the list of shared objects, reference may be made to FIG. 17. FIG. 17 is a schematic diagram of a list of shared objects according to an embodiment of this disclosure. As shown in FIG. 17, the list of shared objects includes at least one shared object. If a target shared object is selected from the list of shared objects, the notification message is sent to the target shared object. That is, a notification message 1602 is displayed in a session window between the sharer and the target shared object. The notification message 1602 carries the access link of the first word and document processing application. In some embodiments, the share button can also be hidden in a subordinate window of the first word and document processing application. When a specific trigger button is selected, the share button is displayed, which is not limited in the embodiments of this disclosure.

In another implementation, this embodiment of this disclosure further supports performing permission setting on the target shared object. In some embodiments, the list of shared objects further includes a permission setting switch. The permission setting switch is configured to set a permission of the target shared object. The permission herein includes, but is not limited to, a browsing permission, a component configuration permission, or a content filling permission. When the target shared object is set to have the component configuration permission, the terminal device updates the first word and document processing application according to configuration information submitted by the target shared object for the target component in the service page of the first word and document processing application. In other words, the target shared object has a permission to configure the target component in the editing region, for example, can add the target component to the editing region, and in another example, can change a position of the target component in the editing region, and so on. When the target shared object is set to have the content filling permission, the terminal device can receive target content submitted by the target shared object, and fill the target content in the service page of the first word and document processing application. In other words, the target shared object has a permission to fill the target content in the target component, for example, change the content in the target component, and in another example, fill the target content in the target component, and so on. In addition, when a permission is set for the target shared object, in addition to setting permissions according to the foregoing operation types, a permission can be further set according to an operation range. For example, whether the target shared object has an operation permission to a specific target component is set. For example, the editing region includes a target component A, a target component B, a target component C, and a target component D. The target shared object is set to have no operation permission or have some operation permissions (e.g., have a browsing operation permission, but not have an editing operation permission) to the target component A, and have all operation permissions or the like to the target component B, the target component C, and the target component D. The permission of the target shared object can be set according to different dimensions. This embodiment of this disclosure is described by using the related content described above as an example, which does not limit the embodiments of this disclosure.

Figure 18:
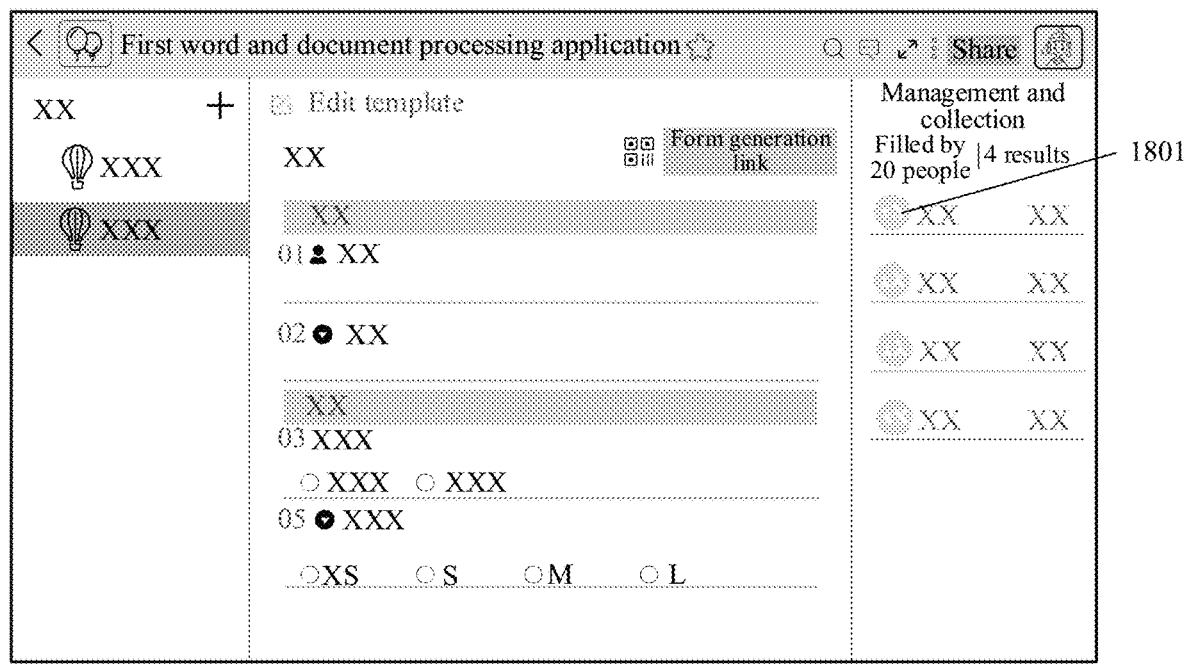
FIG. 18 is a schematic diagram of a word and document processing application publishing page according to an embodiment of this disclosure.
Figure 19:
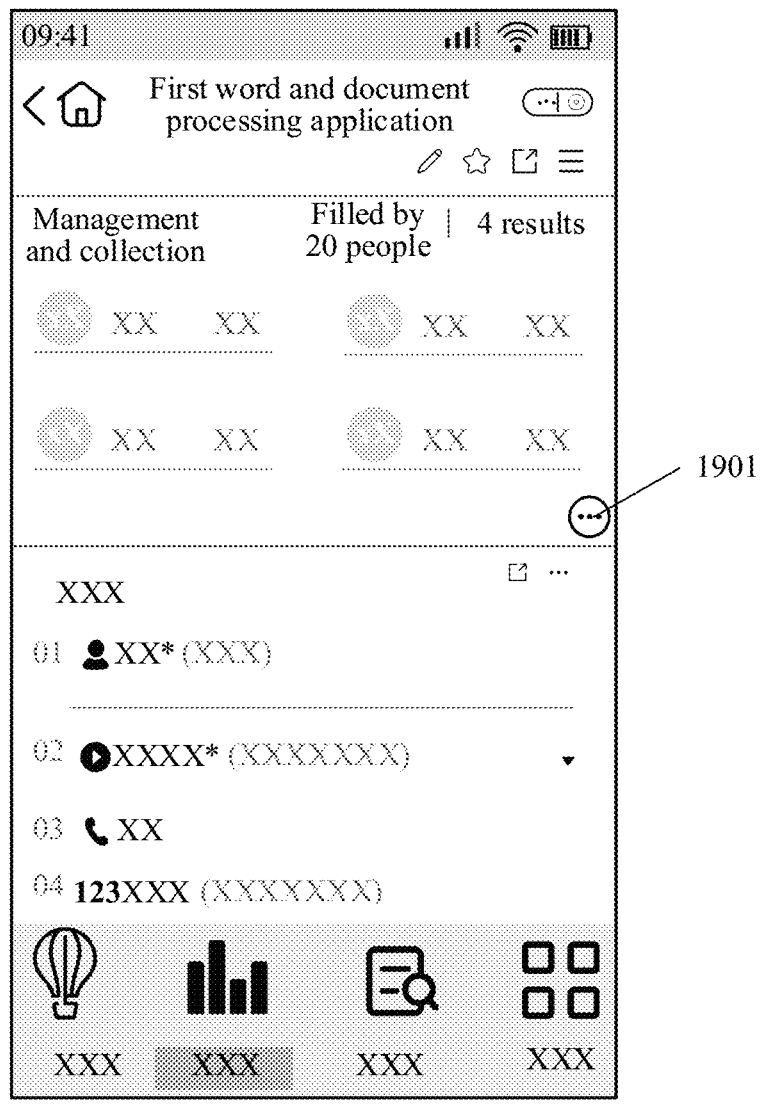
FIG. 19 is a schematic diagram of a word and document processing application publishing page according to an embodiment of this disclosure.

In still another implementation, after the sharer shares the first word and document processing application with at least one target shared object, the sharer can view a status of editing the first word and document processing application by target shared objects in the at least one target shared object. FIG. 18 is a schematic diagram of a word and document processing application publish page according to an embodiment of this disclosure. As shown in FIG. 18, a status of editing the first word and document processing application by target shared objects is displayed on the component center panel in the editing interface of the first word and document processing application. For example, a quantity of the target shared objects is 20, a quantity of persons editing the first word and document processing application is 4, and a quantity of persons not editing the first word and document processing application is 16. In addition to displaying the foregoing information, the component center panel also displays an identifier (e.g., an identifier 1801) of a target shared object editing the first word and document processing application. When any identifier in identifiers of the four target shared objects is selected, the editing region displays target content corresponding to the identifier of the target shared object. In this way, the user creating the first word and document processing application can conveniently view collected information, which helps the user to resolve the scenario problem. The word and document processing application publishing page shown in FIG. 18 is merely an implementation of this embodiment of this disclosure. Such an implementation is merely used for describing a composition architecture of the word and document processing application publishing page, and is not intended to limit a presentation form of the word and document processing application publishing page. For example, in FIG. 18, although the identifier of the at least one target shared object is displayed in the right-side region of the first word and document processing application, the identifier of the at least one target shared object may also be displayed in another region of the first word and document processing application, for example, be displayed in the left-side region of the first word and document processing application. Briefly, in this disclosure, the word and document processing application publishing page may have another representation form. For example, FIG. 19 is a schematic diagram of a word and document processing application publishing page according to an embodiment of this disclosure. As shown in FIG. 19, a middle region of the editing interface of the first word and document processing application can be configured to display the identifier of the at least one target shared object. Because the length of the display screen is limited, the target shared objects may not all be displayed in the editing interface. Therefore, the editing interface may include an identifier 1901. When the identifier 1901 is selected, displaying of a hidden identifier of a target shared object is triggered.

In conclusion, the target shared object may select the notification message in the session window between the sharer and the target shared object, to access the first word and document processing application through the notification message. When the target shared object has a component configuration permission, the target shared object may configure the target component in the editing interface of the first word and document processing application, content in the configured first word and document processing application may be synchronously updated to the access link in the first word and document processing application. When the access link (e.g., the notification message) is clicked again, the target component in the editing interface of the first word and document processing application is the updated target component. In this way, a plurality of persons can cooperatively create or edit the first word and document processing application, thereby enhancing the user's sense of identity with the product used for creating the first word and document processing application, and improving the user experience.

In addition, the target shared object selects the notification message in the session window between the sharer and the target shared object, which indicates that the first word and document processing application is started and run. A working procedure of a backend (e.g., a server backend or a server) after the first word and document processing application is started and run is described below in detail.

Figure 20:
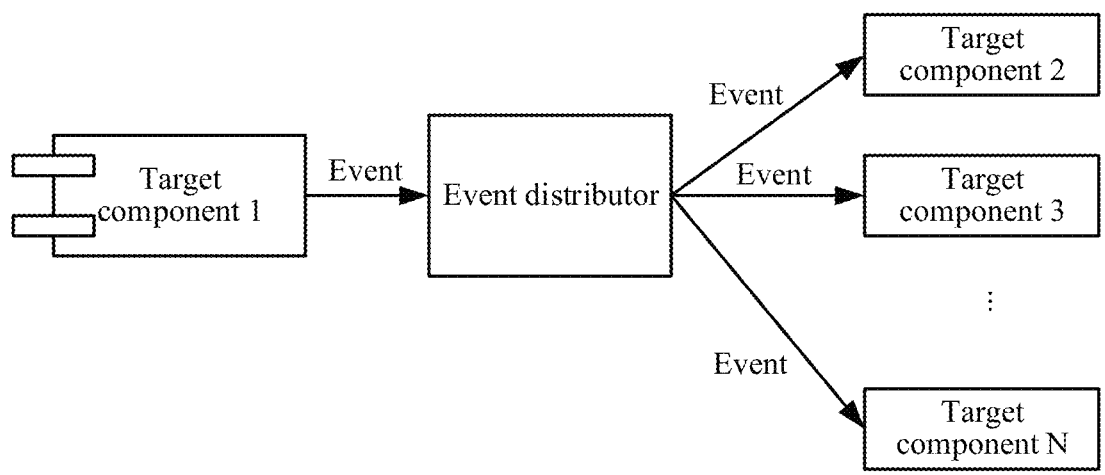
FIG. 20 is a schematic diagram of a global event distribution mechanism according to an embodiment of this disclosure.

In some embodiments, the editing interface is carried by, or displayed on, a canvas. The target component is mounted on the canvas, to cause the target component to be displayed in the editing region. The canvas performs management on the components included in the editing interface in a modularized manner. The management herein may include, but is not limited to: loading, by the canvas, the editing interface after the first word and document processing application is successfully published and when the first word and document processing application is accessed, and loading pieces of function logic of the components in the editing interface in a modularized manner after the editing interface is loaded. The modularized loading manner can be understood as loading the pieces of function logic of the components in the editing interface in sequence. In addition, the backend may further load function logic configured for a target component in a process of creating the first word and document processing application. The loading function logic configured for a target component in a process of creating the first word and document processing application may include, but is not limited to: (1) Load function logic of connecting the target component to a system standard event mechanism. The system standard event mechanism may include a mouse event, a touch event, and the like. The mouse event may include: a mouse double-click event, a mouse click event, a mouse left-click event, a middle mouse button event, and the like. The connecting the target component to the system standard event mechanism refers to granting permissions to various events under a target component standard event mechanism. For example, the target component is connected to a mouse event, then an event of the target component can be triggered by double-clicking or clicking the mouse. (2) Establish a global event distribution mechanism for the target component. The global event may include, but is not limited to, a copy event, a paste event, a search event, a cut event, and the like. The global event distribution mechanism refers to distributing global events to focus components (target components). For example, if target content filled in the target component A is copied to the target component B, a copy event is distributed to the target component A, and a paste event is distributed to the target component B. FIG. 20 is a schematic diagram of a global event distribution mechanism according to an embodiment of this disclosure. As shown in FIG. 20, events of a target component 1 may be distributed by an event distributor to a target component 2, a target component 3, and a target component N. (3) Load (or activate) a custom event of the target component. The target component may communicate with another component in the editing region through the custom event and the global event distribution mechanism. For example, the target component A and the target component B are target components having an association relationship. Only when the target component A is executed (e.g., edited), the target component B takes effect. Therefore, the target component A and the target component B may customize events for communication and connection. In addition, the backend may also load function logic of the target component. For example, a countdown target component triggers a reminder or performs a specific task when the timing ends.

Figure 21:
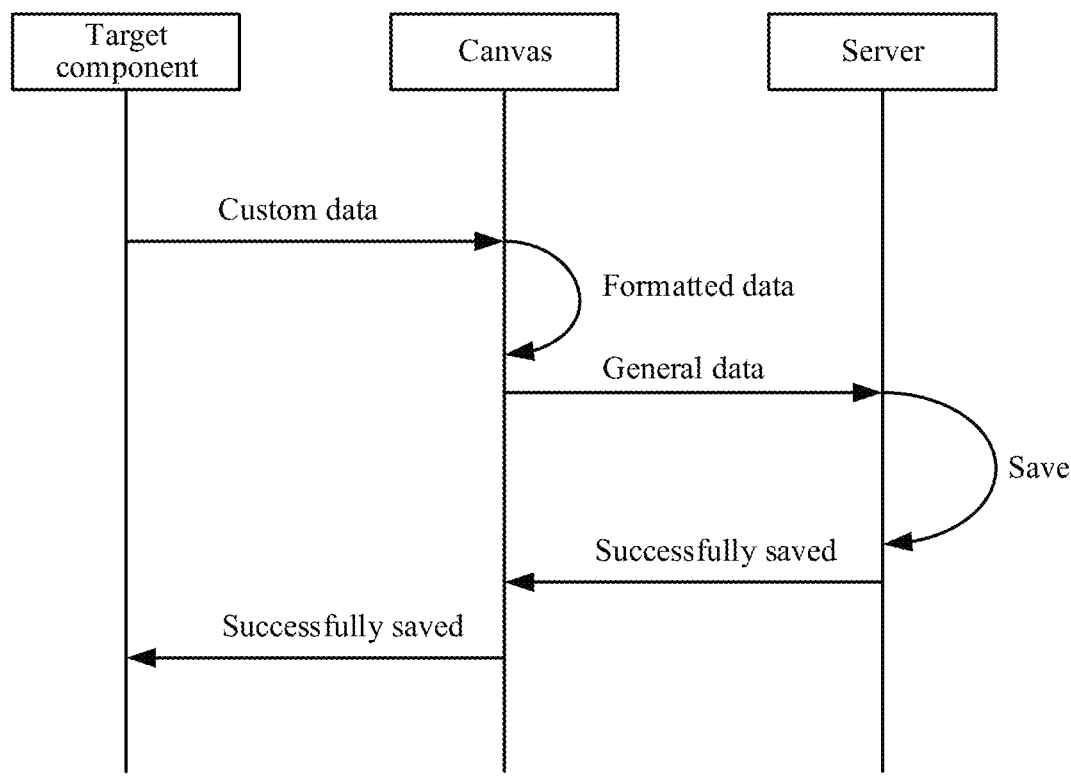
FIG. 21 is a schematic diagram of data storage according to an embodiment of this disclosure.

It may be understood that, data storage or transmission is involved in either creating the first word and document processing application, publishing or sharing the first word and document processing application, or accessing the first word and document processing application. A data communication interface is defined between the canvas (for carrying the editing interface) provided in this embodiment of this disclosure and the server. Any data in the editing interface of the first word and document processing application is transmitted through the data communication interface to the server for storage, or the first word and document processing application obtains data from the server through the data communication interface, thereby implementing data transmission. FIG. 21 is a schematic diagram of data storage according to an embodiment of this disclosure. As shown in FIG. 21, the target component sends custom data to the canvas. The canvas formats the custom data to obtain formatted data that meets a data format of the data communication interface. The canvas sends formatted data to a server. The server stores the formatted data, and returns a prompt message indicating successful saving to the canvas and target component. When the first word and document processing application is opened in a plurality of terminal devices, data sharing among the plurality of terminal devices can be implemented through a general data interface provided by the canvas. Compared with the existing one, a data interface and a data format need to be defined between a client and the backend. This embodiment of this disclosure can avoid complex interaction between the client and the server, and improve the efficiency and speed of data transmission.

The method in the embodiments of this disclosure is described in detail above. For ease of better implementing the foregoing solutions in the embodiments of this disclosure, an apparatus in an embodiment of this disclosure is correspondingly provided in the following.

Figure 22:
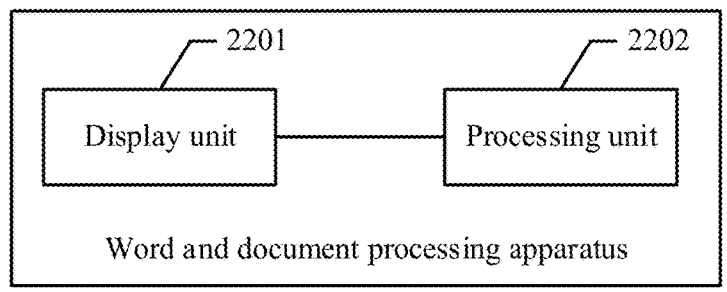
FIG. 22 is a schematic structural diagram of a word and document processing apparatus according to an embodiment of this disclosure.

FIG. 22 is a schematic structural diagram of a word and document processing apparatus according to an embodiment of this disclosure. The word and document processing apparatus may be a computer program (including program code) run on a terminal device 101. For example, the word and document processing apparatus may be a Tencent Docs client in the terminal device 101. The word and document processing apparatus may be configured to perform some or all of the steps in the method embodiments shown in FIG. 2 and FIG. 6, as well as steps such as publishing and sharing the first word and document processing application. Referring to FIG. 22, the word and document processing apparatus can include a display unit 2201 and a processing unit 2202. One or more modules, submodules, and/or units of the apparatus can be implemented by processing circuitry, software, or a combination thereof, for example.

The display unit 2201 is configured to display an editing interface of a first word and document processing application, the editing interface including an editing region and a component center panel, the component center panel including a component list, the component list including a plurality of predefined components, each component being configured to execute a word and document processing function under at least one scenario type; and present at least one target component in the editing region, the target component including at least one of the following: a template component or a component selected from the component center panel according to a received selection instruction. The processing unit 2202 is configured to generate a service page of a first word and document processing application by using the target component in the editing region, the service page being provided to a device accessing the first word and document processing application, to enable the device to perform word and document processing through the service page.

In an implementation, the procedure of selecting at least one component from the component center panel includes: locking at least one candidate component in the component center panel according to a received lock instruction; dragging the locked candidate component along a direction of the editing region according to a received drag instruction, to cause the candidate component to enter into the editing region; and determining the candidate component as the target component when the candidate component is placed in the editing region.

In one technical solution, the candidate component is dragged from the component center panel to the editing region, so that the operation of creating the word and document processing application based on the target component is simple and convenient.

In another implementation, in the process of dragging the locked candidate component along a direction of the editing region according to a received drag instruction, when there is a free space in the editing region, the candidate component is placed into the free space when the candidate component enters into the editing region.

When there is no free space in the editing region, the candidate component is released, and prompt information indicating insufficient space is outputted.

In another implementation, the processing unit 2202 is further configured to: in the process of dragging the locked candidate component along a direction of the editing region according to a received drag instruction, place, when there is a free space in the editing region, the candidate component into the free space when the candidate component enters into the editing region; and release, when there is no free space in the editing region, the candidate component, and output prompt information indicating insufficient space.

In another implementation, the processing unit 2202 is further configured to: add or delete a target component to or from the editing region; adjust an attribute of the target component, the attribute including at least one of a position, a size, or a style; and change content of the target component, the content including at least one of a form, a text, or a picture.

In a technical solution, configuring the target component displayed in the editing region is supported, which can meet the customized requirements of the user for the word processing application, so that the user can become a creator of a solution to the scenario problem.

In another implementation, the processing unit 2202 is further configured to: display a main service page of a second application, the main service page including a starting mark of a word and document processing application center page; receive a selection on the starting mark of the word and document processing application center page, and display the word and document processing application center page of the second application, a creation entry for a word and document processing application being set in the word and document processing application center page; and select the creation entry to trigger displaying of the editing interface of the first word processing application, to trigger creation of the first word and document processing application.

In another implementation, the processing unit 2202 is further configured to constitute a service page of the first word and document processing application by a layout and content of a target component in the editing region that is configured. The service page of the first word and document processing application includes a return option. The processing unit 2202 is further configured to switch from the first word and document processing application to the main service page of the second application when the return option is selected.

In another implementation, the creation entry refers to a create option in the word processing application center page. When creation of the first word and document processing application is triggered by selecting the create option, an editing region in the editing interface of the first word processing application of which displaying is triggered is a blank region.

In another implementation, the word and document processing application center page includes at least one scenario type and a word and document editing template under each scenario type. The word and document editing template includes at least one template component. The processing unit 2202 is further configured to display, in a preview mode, a template component of the target word and document editing template when the target word and document editing template in the word and document processing application center page is selected, the target word and document editing template being any word and/or document editing template in the word and document editing template.

The creation entry refers to a use confirmation option in a preview page of the target word and document editing template. When creation of the first word and document processing application is triggered by selecting the use confirmation option, an editing region in the editing interface of the first word and document processing application of which displaying is triggered includes the template component of the target word and document editing template.

In a technical solution, the word and document processing application center page includes word and/or document editing templates under a plurality of scenario types. The user may select a target word and document editing template from the word and/or document editing templates according to scenario requirements. In this case, a template component of the target word and document editing template is displayed in the editing interface of the first word and document processing application. This can help the users to reduce the operations of designing a word and document processing application by themselves, and improve the efficiency of creation of a word and document processing application.

In another implementation, the processing unit 2202 is further configured to: publish the first word and document processing application, a manner of the publishing the first word and document processing application including at least one of the following: saving the target component in an editing region according to a period to publish the first word and document processing application, or selecting a publish button in the editing interface to publish the first word and document processing application, the main service page of the second application further including a word and document processing application list that is successfully published; and display, when the first word and document processing application is successfully published, the first word and document processing application in the word and document processing application list that is successfully published in the main service page of the second application.

In another implementation, a service page of the first word and document processing application is constituted by a layout and content of a target component in the editing region that is completely configured. After the first word and document processing application is successfully published, the first word and document processing application includes an access link. A sharing entry is set in the service page of the first word and document processing application. The processing unit 2202 is further configured to: trigger displaying of a list of shared objects when the sharing entry is selected, the list of shared objects including at least one shared object; and display, when a target shared object in the list of shared objects is selected, a notification message in a session window with the target shared object, the notification message carrying an access link of the first word and document processing application, for accessing the first word and document processing application through the notification message.

In another implementation, the list of shared objects further includes a permission setting switch, the permission setting switch being configured to set a permission of the target shared object, the permission including a browsing permission, a component configuration permission, or a content filling permission.

The processing unit 2202 is further configured to: update, when the target shared object is set to have the component configuration permission, the first word and document processing application according to configuration information submitted by the target shared object for the target component in the service page of the first word and document processing application; and receive, when the target shared object is set to have the content filling permission, target content submitted by the target shared object, and fill the target content in the service page of the first word and document processing application.

In a technical solution, the target shared object can access the first word processing application through the notification message, and edit the target component in the editing region of the first word and document processing application, which implements that a plurality of persons cooperatively create or edit the first word and document processing application, thereby making it easier to promote the product for creating a word and document processing application.

In another implementation, the editing interface is carried by a canvas. The target component is mounted on the canvas, to cause the target component to be displayed in the editing region.

The canvas performs management on the components included in the editing interface in a modularized manner, the management including: loading, by the canvas, the editing interface after the first word and document processing application is successfully published and when the first word and document processing application is accessed, and loading pieces of function logic of the components in the editing interface in a modularized manner after the editing interface is loaded.

The configuring the target component in the editing region includes at least one of the following: connecting the target component to a system standard event mechanism; establishing a global event distribution mechanism for the target component; or activating a custom event mechanism of the target component.

According to an embodiment of this disclosure, the units of the word and document processing apparatus shown in FIG. 22 may be separately or wholly combined into one or several other units, or one (or more) of the units herein may further be divided into multiple units of smaller functions. In this way, same operations can be implemented, and implementation of the technical effects of this embodiment of this disclosure is not affected. The foregoing units are divided based on logical functions. In an actual application, a function of one unit may also be implemented by a plurality of units, or functions of a plurality of units are implemented by one unit. In other embodiments of this disclosure, the word and document processing apparatus may also include other units. During actual application, the functions may also be cooperatively implemented by other units and may be cooperatively implemented by a plurality of units. According to another embodiment of this disclosure, a computer program (including program code) that can be configured to perform the steps involved in the method embodiments shown in FIG. 2 and FIG. 6 and publishing and sharing the first word and document processing application may be run on a general-purpose computing device, such as a computer, which includes processing elements and storage elements such as a central processing unit (CPU), a random access memory (RAM), and a read-only memory (ROM), to construct the word and document processing apparatus shown in FIG. 22 and implement the word and document processing method in the embodiments of this disclosure. The computer program may be recorded on, for example, a computer-readable recording medium (e.g., a non-transitory computer-readable storage medium), and may be loaded into the foregoing computing device by using the computer-readable recording medium and run on the computing device.

In this embodiment of this disclosure, a display unit 2201 of the terminal device 101 is configured to display an editing interface of a first word and document processing application, the editing interface including an editing region and a component center panel, the component center panel including a component list, the component list including at least one scenario type and a plurality of components under the scenario type. The editing region may be configured to present at least one target component. The target component may be a template component dragged from the component center panel or preset in the editing region. Moreover, configuring the target component in the editing region is also supported. The configuration manner may be addition or deletion, changing, or the like. In this way, the creation of first word and document processing application is achieved. Based on this, target components are combined simply and conveniently in the editing region, which can achieve codeless creation of a word and document processing application, reduce the complexity of creation of a word and document processing application, and improve the convenience of creation of a word and document processing application. In other words, the word and document processing application creation solution does not require the user to perform complex backend code programming, which reduces the threshold for creation of a word and document processing application. The first word and document processing application can be generated by the user by selecting components under one or more scenario types for combination, so that the first word and document processing application can appropriately meet actual scenario-based requirements of the user. Each user can become a creator of a solution under a specific scenario by creating a word and document processing application, thereby enhancing the user's sense of belonging and participation in a content editing product. In addition, publishing and sharing of the created word and document processing application are also supported. After the word and document processing application is successfully published, the creator can enter the first word and document processing application again through the main service page of the second application to edit the first word and document processing application. In addition, after the word and document processing application is successfully published, the word and document processing application can also be shared with the target shared object. In a process of selecting the target shared object, a permission of the target shared object is set. For example, in a case that the target shared object has a component configuration permission, the target shared object can configure the target component in the word and document processing application, which allows a plurality of persons to cooperatively create the word and document processing application, improves the efficiency of creation of a word and document processing application, and makes the user experience better.

Figure 23:
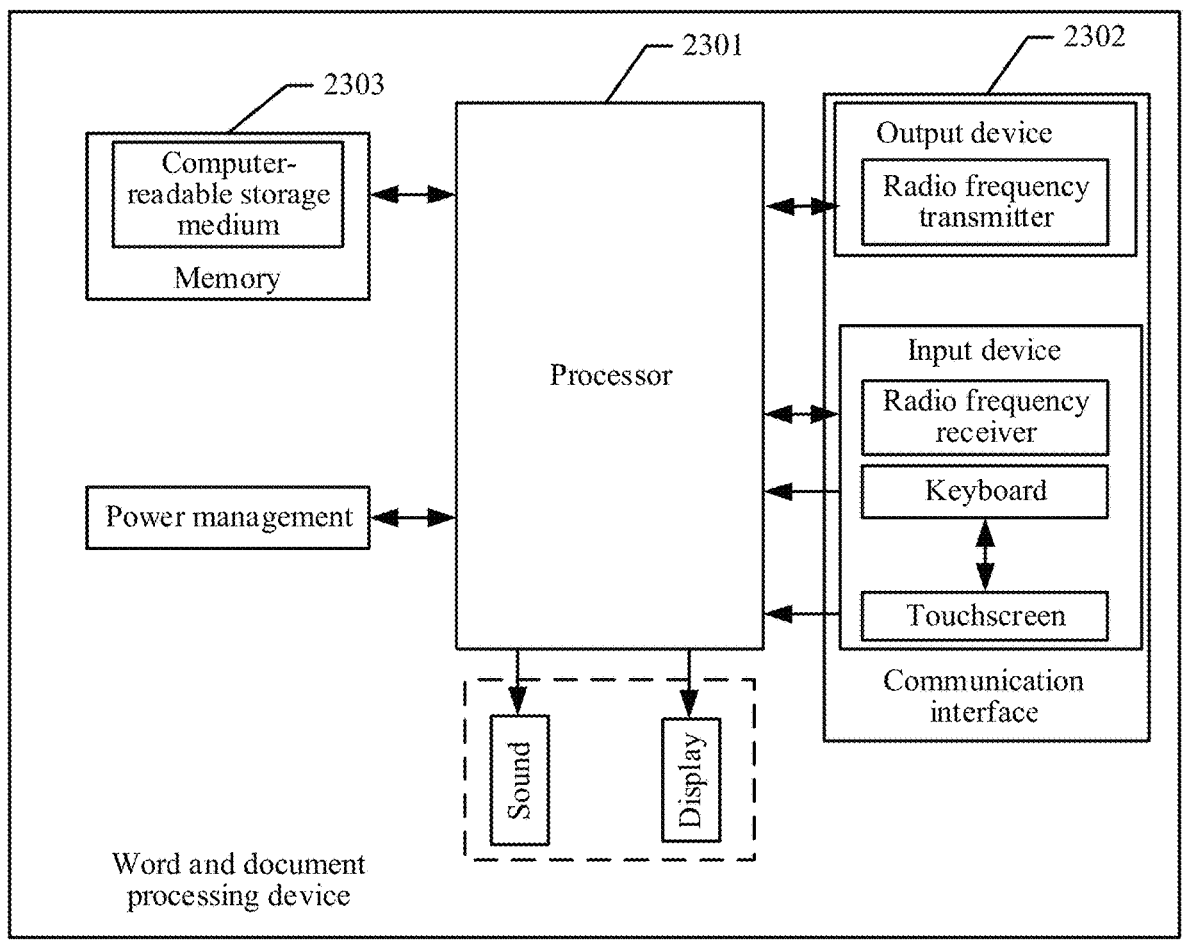
FIG. 23 is a schematic structural diagram of a word and document processing device according to an embodiment of this disclosure.

FIG. 23 is a schematic structural diagram of a word and document processing device according to an embodiment of this disclosure. Referring to FIG. 23, the word and document processing device includes processing circuitry such as a processor 2301, a communication interface 2302, and a computer-readable storage medium 2303. The processor 2301, the communication interface 2302, and the computer-readable storage medium 2303 are connected to each other through a bus or in another manner. The communication interface 2302 is configured to send and receive data. The computer-readable storage medium 2303 may be stored on a memory of the word and document processing device. The computer-readable storage medium 2303 is configured to store a computer program. The computer program includes program instructions. The processor 2301 is configured to execute the program instructions stored on the computer-readable storage medium 2303. The processor 2301 (or referred to as a central processing unit (CPU)) is an example of processing circuitry and can include a computing core and a control core of the word processing device, is suitable for implementing one or more instructions, and is specifically suitable for loading and executing one or more instructions to implement a corresponding method procedure or a corresponding function.

The embodiments of this disclosure further provide a computer-readable storage medium (memory). The computer-readable storage medium is a memory device in the word processing device and is configured to store programs and data. It may be understood that the computer-readable storage medium herein may include an internal storage medium of the word and document processing device and may further include an extended storage medium supported by the word and document processing device. The computer-readable storage medium provides storage space, and the storage space stores an operating system of the word and document processing device. In addition, the storage space further stores one or more instructions adapted to be loaded and executed by the processor 2301. The instructions may be one or more computer programs (including program code). The computer-readable storage medium herein may be a high-speed RAM memory, or may be a non-volatile memory, such as at least one magnetic disk storage. The computer storage medium may be at least one computer-readable storage medium far away from the foregoing processor.

In an embodiment, the word and document processing device may be the terminal device 101 shown in FIG. 1. The computer-readable storage medium stores one or more instructions. The processor 2301 loads and executes one or more instructions stored in the computer-readable storage medium, to implement corresponding steps the foregoing embodiments of the word and document processing method. In an embodiment, the one or more instructions in the computer-readable storage medium are loaded by the processor 2301 to further perform the following steps:

displaying an editing interface of a first word and document processing application, the editing interface including an editing region and a component center panel, the component center panel including a component list, the component list including at least one scenario type and a plurality of components under each scenario type; present at least one target component in the editing region, the target component including at least one of the following: a template component or a component selected from the component center panel; and configuring the target component in the editing region to generate the first word and document processing application.

In an implementation, the procedure of selecting at least one component from the component center panel includes: locking at least one candidate component in the component center panel; dragging the locked candidate component along a direction of the editing region, to cause the candidate component to enter into the editing region; and determining the candidate component as the target component when the candidate component is successfully placed in the editing region.

In a technical solution, the candidate component is dragged from the component center panel to the editing region, so that the operation of creating the word and document processing application based on the target component is simple and convenient.

In another implementation, the one or more instructions in the computer-readable storage medium are loaded by the processor 2301 to further perform the following steps: in the process of dragging the locked candidate component along a direction of the editing region according to a received drag instruction, placing, when there is a free space in the editing region, the candidate component into the free space when the candidate component enters into the editing region; and releasing, when there is no free space in the editing region, the candidate component, and output prompt information indicating insufficient space.

In another implementation, the configuring the target component in the editing region includes at least one of the following: adding or deleting a target component to or from the editing region; adjusting an attribute of the target component, the attribute including at least one of a position, a size, or a style; and changing content of the target component, the content including at least one of a form, a text, or a picture.

In another implementation, the one or more instructions in the computer-readable storage medium are loaded by the processor 2301 to further perform the following steps: displaying a main service page of a second application, the main service page including a starting mark of a word and document processing application center page; receiving a selection on the starting mark of the word and document processing application center page, and displaying the word and document processing application center page of the second application, a creation entry for a word and document processing application being set in the word and document processing application center page; and selecting the creation entry to trigger displaying of the editing interface of the first word and document processing application, to trigger creation of the first word and document processing application.

In another implementation, the one or more instructions in the computer-readable storage medium are loaded by the processor 2301 to specifically perform the following step in response to configuring the target component in the editing region to generate the first word and document processing application: constituting the service page of the first word and document processing application by a layout and content of the target component in the editing region that is configured. The service page of the first word and document processing application includes a return option. The one or more instructions in the computer-readable storage medium are loaded by the processor 2301 to further perform switching from the first word and document processing application to the main service page of the second application when the return option is selected.

In another implementation, the creation entry refers to a create option in the word processing application center page.

When creation of the first word and document processing application is triggered by selecting the create option, an editing region in the editing interface of the first word processing application of which displaying is triggered is a blank region.

In another implementation, the word and document processing application center page includes at least one scenario type and a word and document editing template under each scenario type. The word and document editing template includes at least one template component. The one or more instructions in the computer-readable storage medium are loaded by the processor 2301 to further perform displaying, in a preview mode, a template component of the target word and document editing template when the target word and document editing template in the word and document processing application center page is selected, the target word and document editing template being any word and/or document editing template in the word and document editing template.

The creation entry refers to a use confirmation option in a preview page of the target word and document editing template. When creation of the first word and document processing application is triggered by selecting the use confirmation option, an editing region in the editing interface of the first word and document processing application of which displaying is triggered includes the template component of the target word and document editing template.

In another implementation, the one or more instructions in the computer-readable storage medium are loaded by the processor 2301 to further perform the following steps: publishing the first word and document processing application, a manner of the publishing the first word and document processing application including at least one of the following: saving the target component in an editing region according to a period to publish the first word and document processing application, or selecting a publish button in the editing interface to publish the first word and document processing application, the main service page of the second application further including a word and document processing application list that is successfully published; and displaying, when the first word and document processing application is successfully published, the first word and document processing application in the word and document processing application list that is successfully published in the main service page of the second application.

In another implementation, a service page of the first word and document processing application is constituted by a layout and content of a target component in the editing region that is configured. After the first word and document processing application is successfully published, the first word and document processing application includes an access link. A sharing entry is set in the service page of the first word and document processing application. The one or more instructions in the computer-readable storage medium are loaded by the processor 2301 to further perform the following steps: triggering displaying of a list of shared objects when the sharing entry is selected, the list of shared objects including at least one shared object; and displaying, when a target shared object in the list of shared objects is selected, a notification message in a session window with the target shared object, the notification message carrying an access link of the first word and document processing application, for accessing the first word and document processing application through the notification message.

In another implementation, the list of shared objects further includes a permission setting switch, the permission setting switch being configured to set a permission of the target shared object, the permission including a browsing permission, a component configuration permission, or a content filling permission. The one or more instructions in the computer-readable storage medium are loaded by the processor 2301 to further perform the following steps: updating, when the target shared object is set to have the component configuration permission, the first word and document processing application according to configuration information submitted by the target shared object for the target component in the service page of the first word and document processing application; and receiving, when the target shared object is set to have the content filling permission, target content submitted by the target shared object, and filling the target content in the service page of the first word and document processing application.

In another implementation, the editing interface is carried by a canvas. The target component is mounted on the canvas, to cause the target component to be displayed in the editing region.

The canvas performs management on the components included in the editing interface in a modularized manner, the management including: loading, by the canvas, the editing interface after the first word and document processing application is successfully published and when the first word and document processing application is accessed, and loading pieces of function logic of the components in the editing interface in a modularized manner after the editing interface is loaded.

The configuring the target component in the editing region includes at least one of the following: connecting the target component to a system standard event mechanism; establishing a global event distribution mechanism for the target component; or activating a custom event mechanism of the target component.

In this embodiment of this disclosure, the processor 2301 is configured to display an editing interface of a first word and document processing application, the editing interface including an editing region and a component center panel, the component center panel including a component list, the component list including at least one scenario type and a plurality of components under the scenario type. The editing region may be configured to present at least one target component. The target component may be a template component dragged from the component center panel or preset in the editing region. Moreover, configuring the target component in the editing region is also supported. The configuration manner may be addition or deletion, changing, or the like. In this way, the creation of first word and document processing application is achieved. Based on this, target components are combined simply and conveniently in the editing region, which can achieve codeless creation of a word and document processing application, reduce the complexity of creation of a word and document processing application, and improve the convenience of creation of a word and document processing application. In other words, the word and document processing application creation solution does not require the user to perform complex backend code programming, which reduces the threshold for creation of a word and document processing application. The first word and document processing application can be generated by the user by selecting components under one or more scenario types for combination, so that the first word and document processing application can appropriately meet actual scenario-based requirements of the user. Each user can become a creator of a solution under a specific scenario by creating a word and document processing application, thereby enhancing the user's sense of belonging and participation in a content editing product. In addition, the processor 2301 is further configured to publish and share the created word and document processing application. After the word and document processing application is successfully published, the creator can enter the first word and document processing application again through the main service page of the second application to edit the first word and document processing application. In addition, after the word and document processing application is successfully published, the word and document processing application can also be shared with the target shared object. In a process of selecting the target shared object, a permission of the target shared object is set. For example, when the target shared object has a component configuration permission, the target shared object can configure the target component in the word and document processing application, which allows a plurality of persons to cooperatively create the word and document processing application, improves the efficiency of creation of a word and document processing application, and makes the user experience better.

According to an aspect of this disclosure, a computer program product or a computer program is provided. The computer program product or the computer program includes computer instructions, and the computer instructions are stored in a computer-readable storage medium. A processor of a computer device reads the computer instructions from the computer-readable storage medium. The processor executes the computer instructions, to cause the computer device to perform the word and/or document processing method provided in various manners in the embodiments described in FIG. 2 and FIG. 6 and the embodiments described in the publishing and sharing parts.

A person of ordinary skill in the art may notice that the exemplary units and algorithm steps described with reference to the embodiments disclosed in this disclosure can be implemented in electronic hardware, or a combination of computer software and electronic hardware. Whether the functions are executed by hardware or software depends on particular applications and design constraint conditions of the technical solutions. A person skilled in the art may use different methods to implement the described functions for each particular application, but it is not to be considered that the implementation goes beyond the scope of this disclosure.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, or another programmable device. The computer instructions may be stored in a computer-readable storage medium or transmitted through the computer-readable storage medium. The computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (for example, a solid state disk (SSD)), or the like.

The above descriptions are merely exemplary implementations of this disclosure, and are not intended to limit the scope of this disclosure. Other implementations are within the scope of this disclosure.

What is claimed is:

1. A method for generating a document applet, the method comprising:
displaying an editing interface including an editing region and a component list, the component list including a plurality of predefined components, each of the predefined components being configured to provide a document input template;
adding at least one target component of the plurality of predefined components in the editing region;
generating, by processing circuitry, a page of the document applet to include the document input template of each of the at least one target component in the editing region; and
providing the document applet to a server, the document applet being configured to perform document processing via the page when downloaded to a user terminal.

2. The method according to claim 1, wherein the adding comprises:
receiving a user selection of a candidate component in the component list;
dragging the candidate component to the editing region according to a received drag instruction; and
determining the candidate component as the target component when the candidate component is dragged to the editing region.

3. The method according to claim 2, wherein
the dragging the candidate component includes placing, when the editing region is determined to include free space, the candidate component into the free space when the candidate component enters the editing region.

4. The method according to claim 1, further comprising at least one of:
adding or deleting a target component to or from the editing region;
adjusting an attribute of the target component, the attribute including at least one of a position, a size, or a style; or
changing content of the target component, the content being at least one of a form, a text, or a picture.

5. The method according to claim 1, further comprising:
displaying a main page of an application, the main page including a link to a document applet page;
receiving a user selection of the link to the document applet page;

displaying the document applet page of the application, a creation option for the document applet being included on the document applet page; and displaying the editing interface of the document applet in response to a user selection of the creation option.

6. The method according to claim 5, further comprising:
switching from the document applet to the main page of the application in response to a user selection to close the document applet.

7. The method according to claim 5, wherein
when creation of the document applet is triggered by a user selection of the creation option, the editing region in the editing interface of the document applet is initially a blank region.

8. The method according to claim 5, wherein
the document applet page includes at least one scenario type and a document input template under each of the at least one scenario type; and
the method further comprises:
displaying, in a preview mode, a template component of a target document input template when the target document input template in the editing interface is selected; and
the creation option is a use confirmation option in a preview page of the target document input template; and
when creation of the document applet is triggered by a user selection of the use confirmation option, the editing region in the editing interface of the document applet includes the template component of the target document input template.

9. The method according to claim 5, wherein
the document applet is published by the server, and
the document applet is included in a document applet list on the main page of the application.

10. The method according to claim 1, wherein
a sharing entry is set in the page of the document applet; and
the method further comprises:
displaying a list of shared objects in response to a user selection of the sharing entry, the list of shared objects including at least one shared object; and
displaying, when a target shared object in the list of shared objects is selected, a notification message in a session window with the target shared object, the notification message including an link to access the document applet through the notification message.

11. The method according to claim 10, wherein
the list of shared objects further includes a permission setting switch, the permission setting switch being configured to set a permission of the target shared object, the permission including a browsing permission, a component configuration permission, or a content filling permission; and
the method further comprises:
updating, when the target shared object is set to have the component configuration permission, the document applet according to configuration information submitted by the target shared object for the target component in the page of the document applet; and
receiving, when the target shared object is set to have the content filling permission, target content submitted by the target shared object, and filling the target content in the page of the document applet.

12. An information processing apparatus, comprising:
processing circuitry configured to display an editing interface including an editing region and a component list, the component list including a plurality of predefined components, each of the predefined components being configured to provide a document input template;
add at least one target component of the plurality of predefined components in the editing region;
generate a page of a document applet to include the document input template of each of the at least one target component in the editing region; and
provide the document applet to a server, the document applet being configured to perform document processing via the page when downloaded to a user terminal.

13. The information processing apparatus according to claim 12, wherein the processing circuitry is configured to:
receive a user selection of a candidate component in the component list;
drag the candidate component to the editing region according to a received drag instruction; and
determine the candidate component as the target component when the candidate component is dragged to the editing region.

14. The information processing apparatus according to claim 13, wherein the processing circuitry is configured to:
place, when the editing region is determined to include free space, the candidate component into the free space when the candidate component enters the editing region.

15. The information processing apparatus according to claim 12, wherein the processing circuitry is configured to:
add or delete a target component to or from the editing region;
adjust an attribute of the target component, the attribute including at least one of a position, a size, or a style; or
change content of the target component, the content being at least one of a form, a text, or a picture.

16. The information processing apparatus according to claim 12, wherein the processing circuitry is configured to:
display a main page of an application, the main page including a link to a document applet page;
receive a user selection of the link to the document applet page;
display the document applet page of the application, a creation option for the document applet being included on the document applet page; and
display the editing interface of the document applet in response to a user selection of the creation option.

17. The information processing apparatus according to claim 16, wherein the processing circuitry is configured to:
switch from the document applet to the main page of the application in response to a user selection to close the document applet.

18. The information processing apparatus according to claim 16, wherein
when creation of the document applet is triggered by a user selection of the creation option, the editing region in the editing interface of the document applet is initially a blank region.

19. The information processing apparatus according to claim 16, wherein
the document applet page includes at least one scenario type and a document input template under each of the at least one scenario type;
the processing circuitry is further configured to display, in a preview mode, a template component of a target document input template when the target document input template in the editing interface is selected;

the creation option is a use confirmation option in a preview page of the target document input template; and when creation of the document applet is triggered by a user selection of the use confirmation option, the editing region in the editing interface of the document applet includes the template component of the target document input template.

20. A non-transitory computer-readable storage medium, storing instructions which when executed by a processor cause the processor to perform:

displaying an editing interface including an editing region and a component list, the component list including a plurality of predefined components, each of the predefined components being configured to provide a document input template;

adding at least one target component of the plurality of predefined components in the editing region;

generating a page of a document applet to include the document input template of each of the at least one target component in the editing region; and providing the document applet to a server, the document applet being configured to perform document processing via the page when downloaded to a user terminal.

* * * * *